United States Patent
Yang et al.

(10) Patent No.: US 11,511,246 B2
(45) Date of Patent: Nov. 29, 2022

(54) CARTRIDGE, DETECTION METHOD, AND DETECTION DEVICE

(71) Applicant: SYSMEX CORPORATION, Kobe (JP)

(72) Inventors: Yongjian Yang, Kobe (JP); Tomoyuki Nose, Kobe (JP); Sayuri Tomoda, Kobe (JP); Kazuyoshi Horii, Kobe (JP)

(73) Assignee: SYSMEX CORPORATION, Hyogo (JP)

( * ) Notice: Subject to any disclaimer, the term of this patent is extended or adjusted under 35 U.S.C. 154(b) by 65 days.

(21) Appl. No.: 16/144,238

(22) Filed: Sep. 27, 2018

(65) Prior Publication Data

US 2019/0099728 A1 Apr. 4, 2019

(30) Foreign Application Priority Data

Sep. 29, 2017 (JP) .............................. JP2017-191938

(51) Int. Cl.
*B01F 35/71* (2022.01)
*B01L 3/00* (2006.01)
(Continued)

(52) U.S. Cl.
CPC ...... *B01F 35/71725* (2022.01); *B01F 29/321* (2022.01); *B01F 31/10* (2022.01);
(Continued)

(58) Field of Classification Search
CPC ... G01N 35/00069; G01N 2035/00495; G01N 2035/00524; G01N 2035/00574;
(Continued)

(56) References Cited

U.S. PATENT DOCUMENTS 8,759,081 B2   6/2014  Klaunick et al.
2010/0081213 A1*  4/2010  Lee .................. G01N 21/07
                                                    436/506
(Continued)

FOREIGN PATENT DOCUMENTS

EP   2026074 A2   2/2009
EP   2026074 A3   7/2009
(Continued)

OTHER PUBLICATIONS

Extended European Search Report in Europe Application No. 18196841.3, dated Jan. 15, 2019, 8 pages.

*Primary Examiner* — Dean Kwak
(74) *Attorney, Agent, or Firm* — Crowell & Moring LLP

(57) ABSTRACT

The present invention provides a cartridge, a detection method, and a detection device capable of stabilizing the liquid level of a sample accommodated in a chamber in a predetermined state. A cartridge 20, that is rotated around a rotating shaft 42 for detecting a target substance, is provided with a chamber 100 in which a sample containing a target substance is stored. The chamber 100 includes a first region 110 in which a sample is stored, a second region 120 disposed at a position closer to the rotating shaft 42 than the first region 110, and a protrusion 130 protruding from a position between the first region 110 and the second region 120 to the inner side of the chamber 100.

19 Claims, 17 Drawing Sheets

(51) Int. Cl.
*B01F 31/10* (2022.01)
*B01F 33/30* (2022.01)
*B01F 35/53* (2022.01)
*G01N 35/00* (2006.01)
*G01N 35/04* (2006.01)
*B01F 29/321* (2022.01)
*B01F 31/22* (2022.01)
*B01F 33/453* (2022.01)

(52) U.S. Cl.
CPC .............. *B01F 31/22* (2022.01); *B01F 33/30* (2022.01); *B01F 33/4533* (2022.01); *B01F 35/53* (2022.01); *B01L 3/502746* (2013.01); *B01L 2200/0647* (2013.01); *B01L 2200/16* (2013.01); *B01L 2300/0803* (2013.01); *B01L 2400/043* (2013.01); *B01L 2400/0688* (2013.01); *B01L 2400/086* (2013.01); *G01N 35/00069* (2013.01); *G01N 2035/00574* (2013.01); *G01N 2035/0449* (2013.01)

(58) Field of Classification Search
CPC ....... G01N 2035/0415; G01N 33/4915; G01N 33/54326; G01N 2035/0449; G01N 2035/0458; B01L 2200/16; B01L 2300/0803; B01L 2400/0409; B01L 2400/043; B01L 3/5027; B01L 2200/0647; B01L 3/527; B01L 2400/086; B01L 3/502746; B01L 3/52; B01F 15/0233; B01F 11/0002; B01F 13/0059; B01F 13/1022; B01F 11/0014; B01F 13/0854; B01F 15/00876; B01F 9/0003; B01F 9/002
USPC ......... 422/72, 415, 501–504, 506, 527, 533, 422/548, 554, 186; 436/45, 180
See application file for complete search history.

(56) References Cited

U.S. PATENT DOCUMENTS

| 2012/0040843 | A1 | 2/2012 | Ducree et al. |
| 2013/0112296 | A1* | 5/2013 | Lee ................... B01L 3/502715 137/559 |
| 2014/0186963 | A1 | 7/2014 | Hsiue et al. |

FOREIGN PATENT DOCUMENTS

| EP | 2985063 A1 | 2/2016 |
| JP | 2008-055405 | 3/2008 |
| JP | 2008-056063 | 3/2008 |

* cited by examiner

FIG. 3A Comparative example
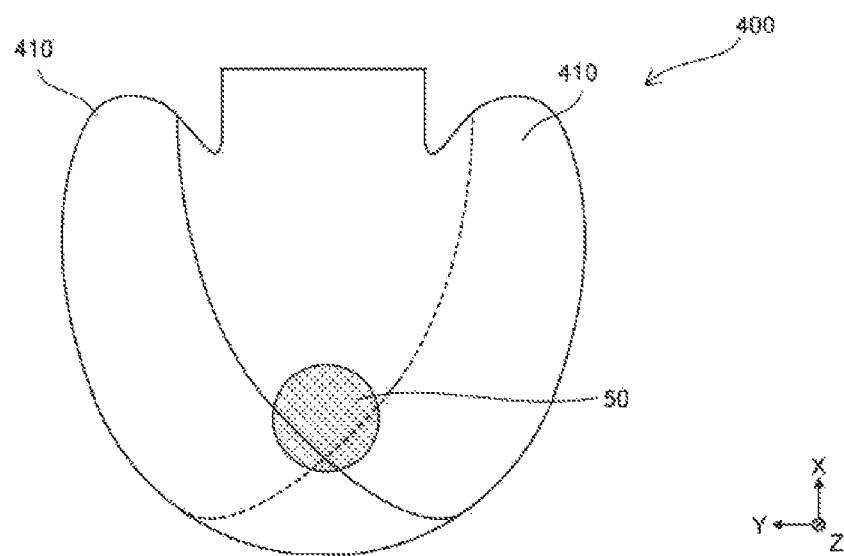
FIG. 3B Comparative example
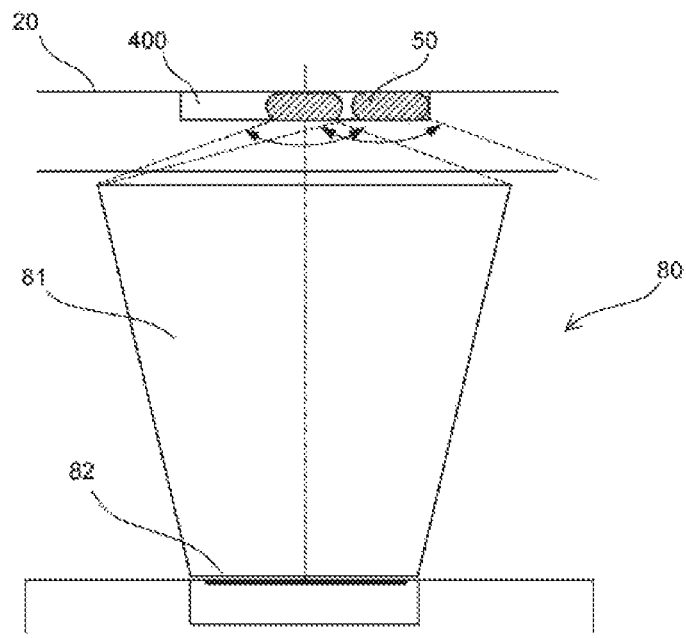

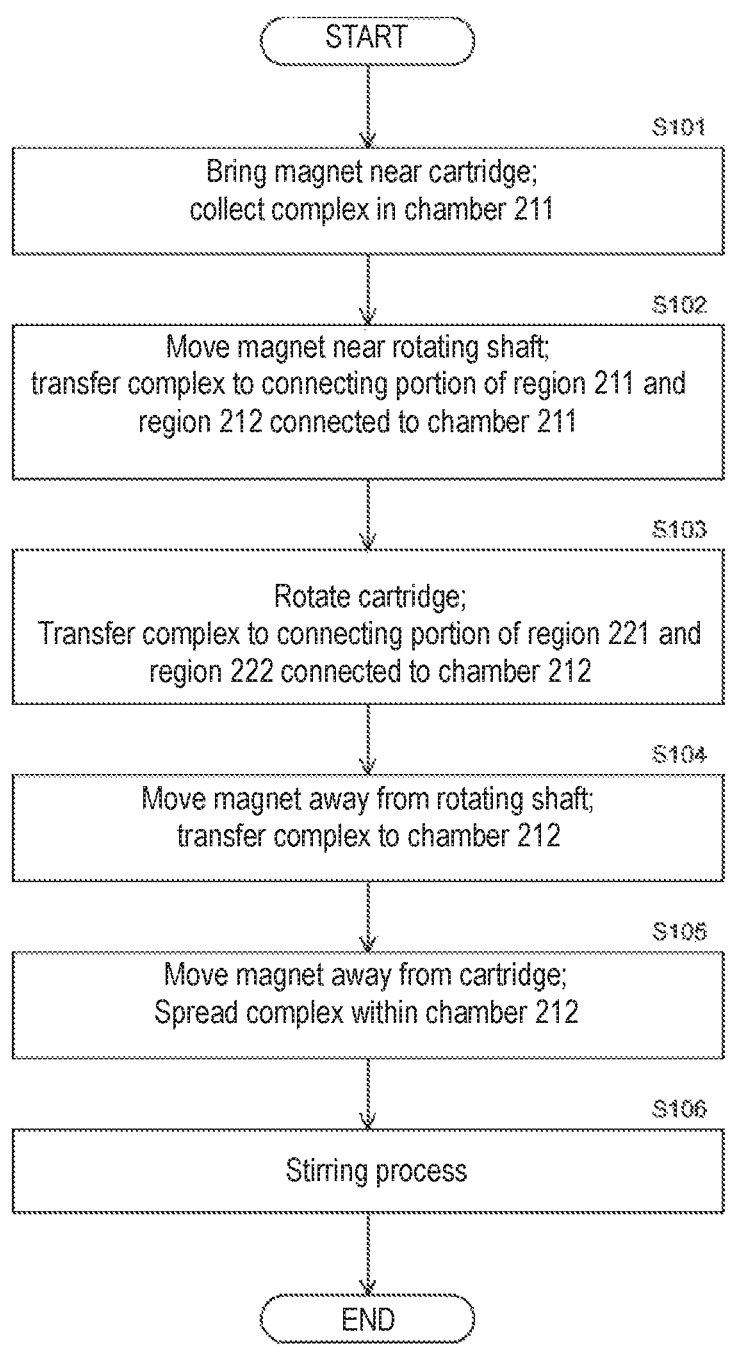

Immediately after stirring

During stirring

During stirring

Liquid level stabilized after stirring stops

CARTRIDGE, DETECTION METHOD, AND DETECTION DEVICE

RELATED APPLICATIONS

This application claim priority from prior Japanese Patent Application No. 2017-191938, filed on Sep. 29, 2017, entitled "Cartridge, Detection Method, And Detection Device", the entire contents of which are incorporated herein by reference.

BACKGROUND OF THE INVENTION

1. Field of the Invention

The present invention relates to a cartridge, a detection method, and a detection device for detecting a target substance.

2. Description of the Related Art

Japanese Patent Application Publication No. 2008-055405 discloses a method in which two kinds of fluids are accommodated in a mixing chamber provided in a substrate, and these two kinds of fluids are mixed rapidly.

Specifically, as shown in FIG. 17, the substrate 1 is provided with a first supply chamber 2 and a second supply chamber 3 in which two different types of fluids are respectively accommodated, and mixing chamber 4 in which the two different types of fluids are mixed. At least two kinds of fluids are sequentially stored in the mixing chamber 4. Thereafter, the substrate 1 is alternately rotated clockwise and counterclockwise until the fluids are mixed. The direction of rotation is changed in the other direction before the vortex flow 5 formed in the mixing chamber 4 disappears, by the rotation in either the clockwise direction or the counterclockwise direction.

SUMMARY OF THE INVENTION

Although at least two kinds of fluids contained in the mixing chamber 4 can be mixed rapidly in the method described in Japanese Patent Application Publication No. 2008-055405, a configuration for stabilizing the liquid surface of the fluid in a predetermined state after the mixing treatment is not disclosed in Japanese Patent Application Publication No. 2008-055405. Here, the following problem may occur if the level of the fluid is not stable after mixing the samples in the chamber. First, the sample may spill out from the chamber if the liquid level of the sample becomes unstable and undulates when mixing of the sample is completed. In such a case, the sample transferred to the next chamber is reduced and it may be impossible to accurately detect the target substance. Next, for example, when magnetic particles bound to a target substance are contained in a sample and the magnetic particles are collected by a magnet, it may be difficult to collect the magnetic particles thoroughly dispersed throughout the sample when the magnetic particles are collected by a magnet if the liquid level of the sample is not stabilized. For example, in the case of detecting a target substance based on fluorescence generated from a labeling substance, since the sample is accommodated in the chamber in an uneven manner, the accuracy of detecting the fluorescence is reduced unless the liquid level of the sample is stabilized.

In this way, in order to smoothly and accurately perform the subsequent processing on the sample accommodated in the chamber, it is desirable to stabilize the liquid level of the sample to a predetermined state after a predetermined treatment such as centrifugation is applied to the sample contained in the chamber.

In view of the above problems, the present invention provides a cartridge, a detection method, and a detection device capable of stabilizing the liquid level of a sample accommodated in a chamber in a predetermined state.

A first aspect of the present invention relates to a cartridge (20) rotated about a rotating shaft (42) for detecting a target substance. The cartridge (20) according to this aspect comprises a chamber (100) containing a sample that includes a target substance. The chamber (100) comprises a first region (110) in which the sample is stored, a second region (120) arranged closer to the rotating shaft (42) than the first region (110), and a protrusion (130) projecting from between the first region (110) and the second region (120) to the inner side of the chamber (100).

With this configuration, when the cartridge in the rotating state is stopped, the liquid level of the sample in the chamber can be stabilized to a predetermined state.

In the cartridge (20) according to this aspect, the side surface of the protrusion (130) on the side of the rotating shaft (42) is formed so as to be away from the rotating shaft (42) as going toward the tip portion (131) of the protrusion (130).

In this way, when a sample is accommodated in the chamber, the sample does not remain on the rotating shaft side of the protrusion. Therefore, the sample can be accommodated in the first region without loss of sample.

In the cartridge (20) according to this aspect, the side surface of the protrusion (130) that is remote from the rotating shaft (42) may be formed to include a curved surface recessed inward of the protrusion (130).

In this way when a sample is accommodated in the chamber and the rotation operation is stopped, the sample can be accommodated in the first region since the sample is directed to the first region.

The cartridge (20) according to this aspect may be configured such that two protrusions (130) are provided at positions facing each other in the circumferential direction of the chamber (100).

In this way when a sample is accommodated in the chamber, the sample can be stably accommodated in the first region.

The cartridge (20) according to this aspect may be configured such that a set of two other protrusions (140) is provided in the radial direction of the rotation shaft (42).

In this way when a sample is accommodated in the chamber, the sample can be stably accommodated in the first region.

In the cartridge (20) according to this aspect, the protrusion (130) and another protrusion (140) may be provided at different positions in the radial direction of the rotation shaft (42).

In this way when a sample is accommodated in the chamber, the sample can be stably accommodated in the first region.

In the cartridge (20) according to this aspect, the volume of the first region (110) can be configured to be greater than 1 time and less than 2 times the amount of sample to be contained in the first region (110).

In this way when a sample is accommodated in the chamber, the sample can be stably accommodated in the first region.

In the cartridge (20) according to this aspect, the second region (120) is connected to a flow path (220), and may be formed to include a protrusion region (122) that protrudes toward the rotating shaft (42) on both sides in the circumferential direction of the flow path.

In this way when a sample is accommodated in the chamber, the sample is accepted by the protrusion region even if the sample moves over the protrusion to the second region during the rotational movement. Therefore, leakage of the sample from the second region to the flow path is suppressed, and the sample can be retained in the chamber.

In the cartridge (20) according to this aspect, the inner side surface (123) of the protrusion region (122) may be formed to include a curved surface.

In this way when a sample is contained in the chamber, the sample returns to the first region even if the sample moves over the protrusion to the second region during the rotational movement. Therefore, the sample can be contained in the first region.

In the cartridge (20) according to this aspect, the inner surface (133) of the portion of the first region (110) away from the rotating shaft (42) is formed so as to include a curved surface bulging away from the rotating shaft.

According to this configuration, for example, when the rotation of the cartridge is controlled so as to stir the sample in the chamber, the sample can be smoothly swung along the inner surface of the first region. Therefore, stirring can be effectively performed.

In the cartridge (20) according to this aspect, the chamber (100) may be configured to have a circumferentially symmetrical shape. In this way the sample can be uniformly housed in the first region in the circumferential direction.

In the cartridge (20) according to this aspect, the tip (131) of the protrusion (130) may be formed to include a curved surface.

In this way when the sample is accommodated in the chamber, the sample easily moves to the first region along the inner surface of the protrusion. Therefore, the sample can be accommodated in the first region without loss of sample.

The cartridge (20) according to this aspect may have a configuration in which a plurality of chambers (100) are provided. In this way various processes can be performed in each chamber.

In this case, the volume of the first region (110) in the at least one chamber (100) may be configured to differ from the volume of the first region (110) in the other chambers (100).

The kinds and amounts of reagents used for the target substance are different. Therefore, by providing chambers having different volumes of the first region, it is possible to smoothly treat various target substances with different types and amounts of suitable reagents. Thus, various processes can be appropriately performed in each chamber.

The cartridge (20) according to this aspect may have a configuration in which a first flow path (221) is provided to connect adjoining chambers (100). In this way the target substance can be transferred between the adjacent chambers. Therefore, it is possible to sequentially perform a series of processes on a target substance using a plurality of chambers.

The cartridge (20) according to this aspect is provided with a plurality of reagent containers (231) which contain reagent and are connected to a plurality of chambers (100). In this way the target substance can be appropriately detected by a plurality of reagents.

In the cartridge (20) according to this aspect, a predetermined reagent container (231) among the plurality of reagent contains (231) holding the reagent contains a capture substance that binds to the target substance. In this way it is possible to smoothly carry out the detection process for the target substance.

In this case, the predetermined reagent container (231) of the plurality of reagent containers (231) containing the reagent may contain magnetic particles. In this way it is possible to smoothly carry out a detection process on the target substance transferred using the magnetic particles.

The predetermined reagent container (231) of the plurality of reagent containers (231) containing the reagent also may contain a labeled antibody. In this way a complex can be generated in which the target substance, the capture substance, the magnetic particles, and the labeled antibody are bound, and the detection process for the target substance can proceed smoothly.

The predetermined reagent container (231) among the plurality of reagent contains (231) containing the reagent also may include a buffer solution. In this way the complex in which the target substance, the capture substance, the magnetic particles, and the labeled antibody are bound is dispersed in the chamber.

The predetermined reagent container (232) among the plurality of reagent containers (231) containing the reagent also may include a luminescent substrate. In this way the target substance can be accurately detected.

A second aspect of the present invention relates to a method of detecting a target substance in a sample accommodated in a chamber (100) by rotating a cartridge (20) having a chamber (100) around a rotating shaft (42). In the detection method of this aspect, the chamber (100) includes a first region (110) in which the sample is stored, a second region (120) arranged closer to the rotating shaft (42) than the first region (110), and a protrusion (130) protruding to the inner side of the chamber (100) from a position between the first region (110) and the second region (120); a reagent is introduced into the chamber (100) containing the sample by the centrifugal force generated by rotating the cartridge (20), the chamber (100) into which the reagent was introduced is stopped at a detection position, and fluorescence given off by the sample to which the reagent was introduced in the chamber (100) stopped at the detection position is detected.

According to the detection method of this aspect, the same effect as in the first aspect can be obtained.

According to the detection method of this aspect, it may include a step of stirring a sample containing a reagent by rotating the chamber (100) into which the reagent is introduced. In this way the sample contained in the chamber is agitated and the target substance can be detected.

In this case, the stirring step may include a step of decreasing the rotational speed after increasing the rotation speed of the cartridge (20).

According to the detection method of this aspect, magnetic force is applied to the magnetic particles contained in the chamber (100), and the magnetic particles are moved in the radial direction of the rotation shaft (42). According to this configuration, a target substance contained in the chamber and bound to magnetic particles can be collected by a magnet and smoothly transferred to another chamber.

A third aspect of the present invention relates to a detection apparatus for detecting a target substance. The detection device (10) according to this aspect includes a cartridge (20) according to the first aspect, a rotation unit (40) for rotating the cartridge (20) around the rotating shaft (42), a detection unit (80) for detecting the target substance, and a control unit (70) for controlling the rotation unit (40).

According to the detection device of this aspect, the target substance can be detected using the cartridge according to the first aspect.

According to the disclosure of the present specification described above, it is possible to stabilize the liquid level of the sample accommodated in the chamber in a predetermined state.

BRIEF DESCRIPTION OF THE DRAWINGS

FIG. 3A is an enlarged schematic diagram of a chamber according to a comparative example of the first embodiment; FIG. 3B is a view illustrating the position of the sample in the chamber according to the comparative example of FIG. 3A;

FIG. 9 is a flowchart showing the operation of the analyzer when transferring a complex between adjacent chambers according to the first embodiment;

DETAILED DESCRIPTION OF THE PREFERRED EMBODIMENTS

1. Basic Structure

Figure 1A:
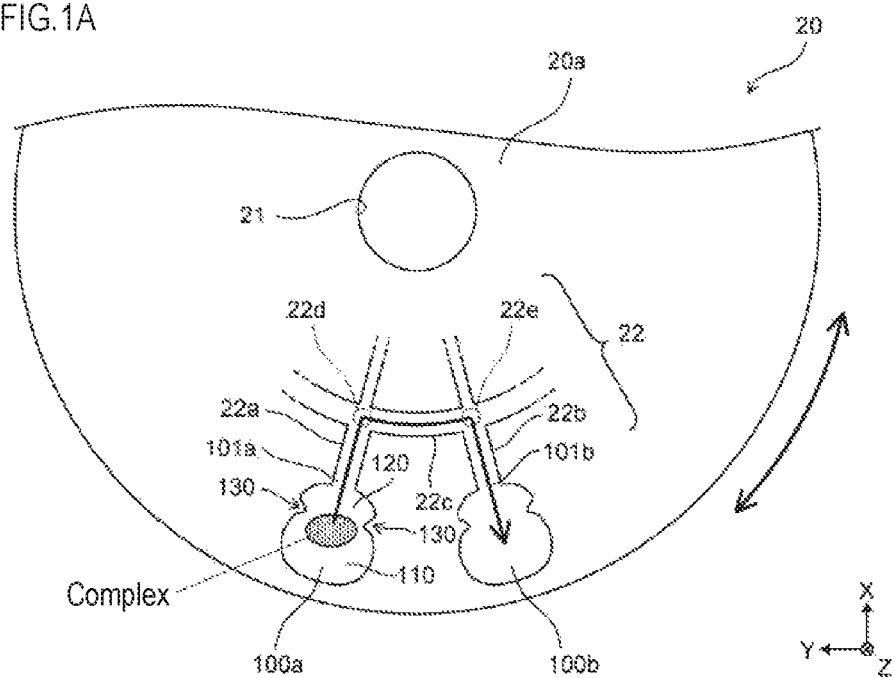
FIG. 1A is a schematic diagram showing a configuration of a cartridge according to the summary of a first embodiment.

The present embodiment relates to a cartridge for detecting a target substance using magnetic particles, a detection method for detecting a target substance using the cartridge, and a detection device. However, all the embodiments described below show comprehensive or concrete examples. Numerical values, shapes, materials, constituent elements, arrangement positions and connection forms of constituent elements, order of operations and the like shown in the following embodiments are merely examples and are not intended to limit the present invention. Among constituent elements in the following embodiments, constituent elements which are not described in the independent claims representing the most significant concepts are described as optional constituent elements.

First, the basic configuration of the cartridge and the detection device according to the present embodiment will be described with reference to the drawings. For convenience, XYZ axes orthogonal to each other are included in each drawing. The X-axis positive direction indicates the rear side of the detection device, the Y-axis positive direction indicates the left direction of the detection device, and the Z-axis positive direction indicates the downward direction of the detection device. The XYZ axes included in the drawings of the cartridge indicate each direction in a state where the cartridge is attached to the detection device.

As shown in FIG. 1A, the cartridge 20 includes a chamber 100, a flow path 22, and a hole 21. The cartridge 200 is a replaceable part for executing a series of processes necessary for detecting a target substance. The cartridge 20 is configured by a plate-shaped and disc-like substrate 20a. When setting the cartridge 20 in the detection device 10, the rotating shaft 42 of the detection device 10 is inserted in the hole 21. The detection device 10 and the rotating shaft 42 will be described later with reference to FIG. 2. The cartridge 20 is not limited to a plate shape, and also may include a raised portion or the like in the vertical direction, and is not limited to a disk shape and may be another shape such as a rectangular shape.

The chamber 100 is a housing provided in the cartridge 20 for accommodating a sample containing a target substance. Hereinafter, the "sample containing a target substance" is simply referred to as "sample". Here, the "sample containing a target substance" may be, for example, only a target substance, or when the sample is in a liquid, the sample may be in a liquid state where a target substance and a reagent are mixed. A sample need not be contained in the chamber 100, and it is sufficient if the chamber 100 has a spatial extent to accommodate the sample. In FIG. 1A, two chambers 100 having the same structure are arranged side by side in the circumferential direction of a circle centered on the rotating shaft 42. Here, for convenience of description, the chamber 100 on the Y-axis positive side is referred to as a first chamber 100a, and the chamber 100 on the Y-axis negative side is referred to as a second chamber 100b. Also, the "circumferential direction of a circle centered on the rotating shaft 42" is simply referred to as "circumferential direction".

The first chamber 100a contains, for example, a complex in a state in which a target substance, magnetic particles, and a labeling substance are bonded to each other. The flow path 22 is connected to the first chamber 100a and the second chamber 100b from the rotating shaft 42 side, so as to connect the first chamber 100a and the second chamber 100b. The first chamber 100a is connected to the flow path 22 at the connection portion 101a, and the second chamber 100b is connected to the flow path 22 at the connection portion 101b.

The flow path 22 includes a first flow path 22a, a second flow path 22b, and a third flow path 22c. The first flow path 22a extends in the radial direction of a circle centered on the rotating shaft 42, and is connected to the first chamber 100a. Here, the "radial direction of a circle centered on the rotating shaft 42" is simply referred to as "radial direction". The second flow path 22b extends in the radial direction and is connected to the second chamber 100b. The third flow path 22c extends in the circumferential direction. Both ends of the third flow path 22c are connected to the first flow path 22a and the second flow path 22b. The first flow path 22a and the third flow path 22c are connected at the connection section 22d. The second flow path 22b and the third flow path 22c are connected at the connection section 22e. In the example shown in FIG. 1A, the first chamber 100a and the second chamber 100b have a liquid phase region for housing a sample. The channel 22 has a gas phase region for accommodating the gas.

Bilateral ends of the third flow path 22c are not necessarily connected to the first flow path 22a and the second flow path 22b. For example, the third flow path 22c connected to the first flow path 22a and the third flow path 22c connected to the second flow path 22b may be separately provided, and the flow path therebetween may be bent in a U shape. A liquid phase region may exist in the channel bent in a U shape. The first flow path 22a and the second flow path 22b may extend in a direction deviated from the radial direction in the horizontal plane as long as it is a direction different from the circumferential direction. The first channel 22a and the second channel 22b may be omitted and the first chamber 100a and the second chamber 100b may be directly connected to the third channel 22c.

The shape of the first chamber 100a will be described below.

Figure 1B:
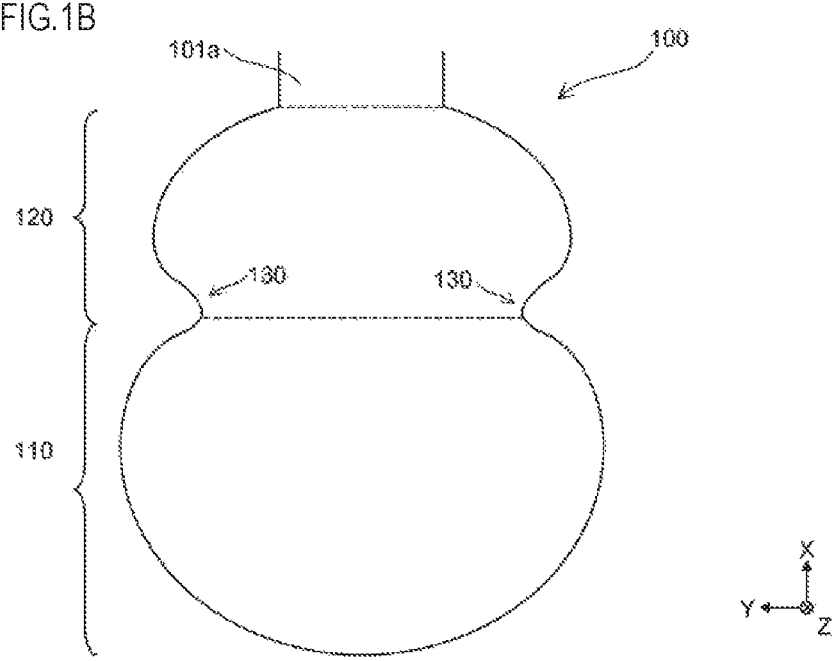
FIG. 1B is an enlarged schematic view of the chamber of the cartridge according to the summary of the first embodiment.

As shown in FIG. 1B, the first chamber 100a has a protrusion 130 protruding to the inner side of the first chamber 100a in the circumferential direction. In FIGS. 1A and 1B, two protrusions 130 are provided on the inner surface of the first chamber 100a. The two protrusions 130 are arranged to align in the circumferential direction. Only a single protrusion 130 also may be provided in the first chamber 100a.

The space inside the first chamber 100a is divided into a first region 110 and a second region 120. In FIG. 1B, the boundary between the first region 110 and the second region 120 is indicated by a broken line. The first region 110 is disposed in a direction away from the rotating shaft 42 in the first chamber 100a and is a region in which the sample is accommodated. The second region 120 is disposed at a position close to the rotating shaft 42 in the first chamber 100a. The protrusion 130 is disposed between the first region 110 and the second region 120.

Note that the first chamber 100a has a symmetrical shape relative to an extension line of one diameter of the rotating shaft 42. Although FIG. 1A shows two chambers 100, the number of chambers 100 is not limited to two. Three or more chambers also may be provided in the cartridge 20.

Figure 2:
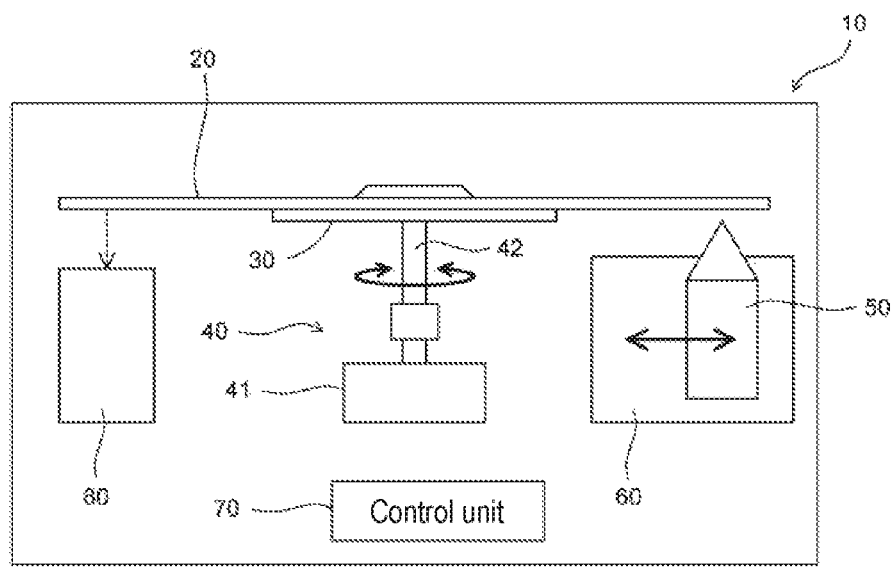
FIG. 2 is a schematic diagram showing a configuration of a detection device according to a first embodiment.

Next, referring to FIG. 2, the configuration of the detection device 10 will be described. In the present embodiment, the detection device 10 uses the cartridge 20 to hold the target substance and the labeling substance on the magnetic particles, and detect the target substance based on the fluorescence generated from the labeling substance.

The detection device 10 includes a support member 30, a rotation unit 40, a magnet 50, a transfer unit 60, a control part 70, and a detection unit 80.

The cartridge 20 is installed on the support member 30. The rotation unit 40 includes a motor 41 and a rotating shaft 42. The rotating shaft 42 extends in the vertical direction. The upper end of the rotating shaft 42 is fixed to the support member 30, and the lower end of the rotating shaft 42 is fixed to the drive shaft of the motor 41. The rotation unit 40 drives the motor 41 to rotate the cartridge 20 installed on the supporting member 30 around the rotating shaft 42.

Magnet 50 collects magnetic particles spread within the chamber 100. The target substance and the labeling substance are bound to the magnetic particles in the chamber 100 as described above. The magnet 50 may be configured by a permanent magnet or an electromagnet.

The transfer unit 60 moves the magnet 50 in a direction different from the circumferential direction in the horizontal plane. Specifically, the transfer unit 60 moves the magnet 50 in the radial direction. The transfer unit 60 also moves the magnet 50 in the vertical direction. That is, the transfer unit 60 moves the magnet 50 toward and away from the rotating shaft 42, and moves the magnet 50 toward and away from the cartridge 20.

Note that when the first flow passage 22a and the second flow passage 22b shown in FIG. 1A are formed so as to extend in a direction shifted from the radial direction, the transfer unit 60 is configured to shift the magnet 50 in a direction shifted from the radial direction. When moving the magnet 50 toward and away from the cartridge 20, the transfer unit 60 also may move the magnet 50 in a direction inclined from the vertical direction.

The transfer unit 60 also may change the relative position between the magnet 50 and the cartridge 20. For example, the transfer unit 60 also may move the cartridge 20 by moving the support member 30 supporting the cartridge 20 so that the magnet 50 is moved relative to the cartridge 20. However, when the support member 30 is moved, the detection device 10 may be increased in size since a structure for moving the support member 30 is separately required. Therefore, it is desirable that the support member 30 is not moved and the magnet 50 is moved relative to the cartridge 20.

The control unit 70 controls the rotation unit 40 and the transfer unit 60. Referring to FIG. 1A, the control unit 70 drives the transfer unit 60 to bring the magnet 50 close to the cartridge 20 at a position facing the first chamber 100a, and the magnetic force of the magnet 50 causes the magnetic particles of the complex to be collected by the magnet 50. Thereafter, the control unit 70 causes the transfer unit 60 to maintain a state where the magnet 50 approaches the cartridge 20 until the magnetic particles are moved to the second chamber 100b.

By moving the magnet 50 in a radial direction from a position facing the first chamber 100a, the control unit 70 moves the magnetic particles collected by the magnet 50 in the first chamber 100a from the first chamber 100a to the flow channel 22. Subsequently, the control unit 70 moves the magnetic particles collected by the magnet 50 in the flow channel 22 by rotating the cartridge 20. Subsequently, the control unit 70 moves the magnet 50 in a radial direction from a position facing the flow path 22, thereby moving the magnetic particles collected by the magnet 50 from the flow path 22 to the second chamber 100b. Note that when the magnetic particles are transferred from the first chamber 100a to the second chamber 100b, the magnetic particles are moved from the liquid phase region of the first chamber 100a to the liquid phase region of the second chamber 100b through the gaseous phase region of the flow path 22.

Specifically, the control unit 70 drives the transfer unit 60 to move the magnet 50 in a direction approaching the rotating shaft 42, so that the magnetic particles in the first chamber 100a pass through the first flow path 22a to the connecting portion 22d. Subsequently, the control unit 70 drives the rotation unit 40 to rotate the cartridge 20, thereby moving the magnetic particles positioned in the connecting portion 22d to the connecting portion 22e through the third channel 22c. The control unit 70 also drives the transfer unit 60 to move the magnet 50 in a direction away from the rotating shaft 42, so that the magnetic particles positioned at the connection unit 22e are transmitted through the second flow path 22b to the second chamber 100b. Thereafter, the control unit 70 drives the transfer unit 60 to move the magnet 50 in a direction away from the cartridge 20. In this way the target substance bound to the magnetic particles is accommodated in the second chamber 100b.

Note that when moving the magnetic particles positioned in the connecting portion 22d to the connecting portion 22e, the rotation unit 40 also may move the magnet 50 relative to the cartridge 20. For example, the rotation unit 40 also may move the magnet 50 in the circumferential direction. However, when the magnet 50 is moved in the circumferential direction, a structure for moving the magnet 50 in the circumferential direction is additionally required, so that the detection device 10 may be increased in size. Therefore, it is preferable that the magnet 50 is not moved, and the cartridge 20 is rotated in the circumferential direction. When the cartridge 20 includes three or more chambers, the control unit 70 also sequentially transfers the magnetic particles to the plurality of chambers as described above.

The detection unit 80 detects light generated from the sample in the second chamber 100b. This detection is based on chemiluminescence, and chemiluminescence will be described later with reference to FIGS. 8 to 11C. The control unit 70 analyzes the target substance based on the light detected by the detection unit 80.

According to the detection device 10 as described above, the target substance in the first chamber 100a can be collected together with the magnetic particles by the magnet 50 and, due to the movement of the magnet 50 in the radial direction and the rotation of the cartridge 20, the target substance can be moved to the second chamber 100b together with the magnetic particles.

As shown in FIG. 1B in the present embodiment, two protrusions 130 are provided in the first chamber 100a and the second chamber 100b, respectively, so as to be arranged in the circumferential direction. These two protrusions 130 stabilize the liquid level of the sample accommodated in the first chamber 100a and the second chamber 100b, and have an action of locating the sample at a predetermined position substantially uniformly in the first region 110. In this way the magnetic particles are suppressed from being left behind by the magnet since the liquid level of the sample is stabilized. When the target substance and the labeling substance are carried on the magnetic particles and the target substance is detected based on the fluorescence generated from the labeling substance, the fluorescence generated by the labeling substance can be accurately and stably detected since the sample is substantially fixed at a position in the chamber 100 when the liquid level of the sample is stabilized.

Hereinafter, the action of the protrusion 130 will be described in comparison with the comparative example.

Comparative Example of Chamber

As shown in FIG. 3A, the protrusion 130 is not provided in the chamber 400 according to the comparative example. Therefore, the chamber 400 is not divided into the first region and the second region by the protrusion 130. The chamber 400 is connected to the flow path 22 on the side of the rotating shaft 42, and has protrusions 410 protruding in a circular arc shape on the side of the rotating shaft 42 on both sides sandwiching a portion connected to the flow path 22.

In the chamber 400 having such a shape, for example, when the cartridge is stopped after stirring the sample in the chamber 400 by rotating the cartridge, the liquid level of the sample is inclined as shown by the solid line in FIG. 3A whereas, alternatively, as shown by the broken line in FIG. 3A, the liquid level of the sample may incline in the opposite direction. That is, in the chamber shape of the comparative example, the state of the liquid surface at the time rotation stops can become unstable. For this reason, for example, when the magnet 50 is positioned at the position shown in FIG. 3A in order to collect the magnetic particles, it may be difficult to collect the magnetic particles in the sample near the protrusion 410 which is greatly distant from the position of the magnet 50, such that the magnetic particles may remain in the chamber 400.

When the position of the sample in the chamber 400 is unstable in this way and fluorescence generated from the sample is detected by the detection unit 80, the detection accuracy may decrease. For example, as shown in FIG. 3B, when the detection unit 80 is configured to capture the fluorescence generated from the sample by a photodetector 82 to which the light is guided by a tubular light guide unit 81, the amount of fluorescence captured by the light guide unit 81 fluctuates depending on whether the sample is accommodated in the center or the sample is accommodated at the end of the chamber 400. For this reason, if the liquid level of the sample accommodated in the chamber 400 is unstable as shown in FIG. 3A, the amount of fluorescence taken into the light guide unit 81 becomes unstable, and as a result the accuracy of detection of the target substance is reduced.

Figure 4A:
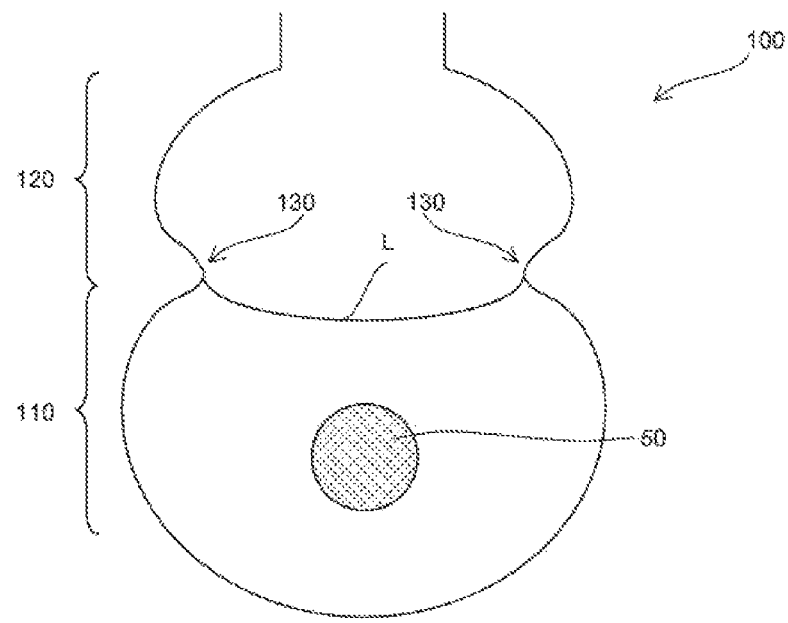
FIG. 4A is an enlarged schematic diagram of a chamber of a cartridge according to the summary of the first embodiment.

Conversely, in the chamber 100 according to the embodiment as shown in FIG. 4A, since the protrusion 130 is provided to protrude into the chamber 100 from the inner side surface of the chamber 100, the sample accommodated in the chamber 100 is restrained by the protrusions 130 on bilateral sides in the circumferential direction after stopping the rotation of the cartridge 20, such that the liquid surface is stabilized by the surface tension and the wettability between the protrusions 130 and the sample, and the sample is readily situated at a predetermined position within the first region 110.

Figure 4B:
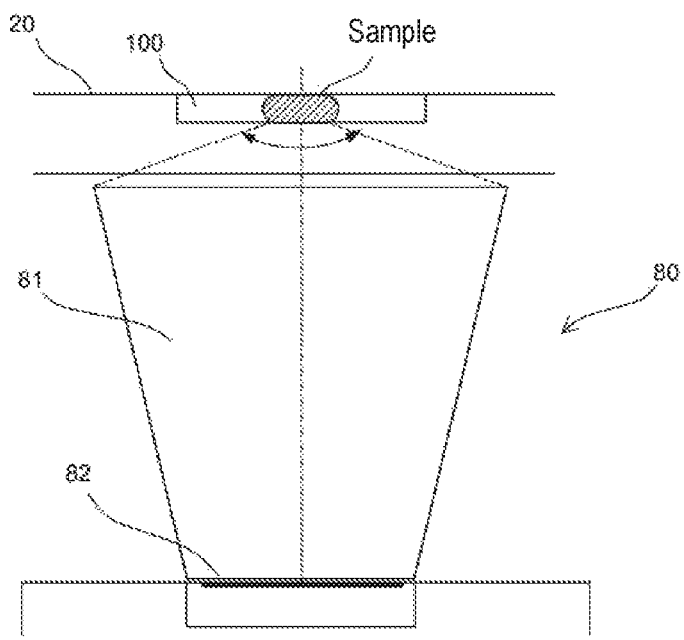
FIG. 4B is a diagram illustrating the position of the sample in the chamber in the chamber according to the first embodiment.

Therefore, when the magnet 50 is positioned at the position shown in FIG. 4A, for example, magnetic particles are smoothly collected from all the sample in the first region 110, and residual magnetic particles remaining in the chamber 100 is suppressed. Since the sample is stably situated in the center of the first region 110 in this way as shown in FIG. 4B, the sample is substantially constant with respect to the entrance of the light guiding unit 81 of the detection unit 80. Therefore, fluctuation of the fluorescence uptake amount due to deviation of the sample does not occur. Hence, the detection accuracy of the target substance can be improved.

2. Specific Structural Example

Next, a specific structural example of the cartridge will be described, and analysis processing of a target substance using this cartridge also will be described.

Shape of Chamber

Figure 5A:
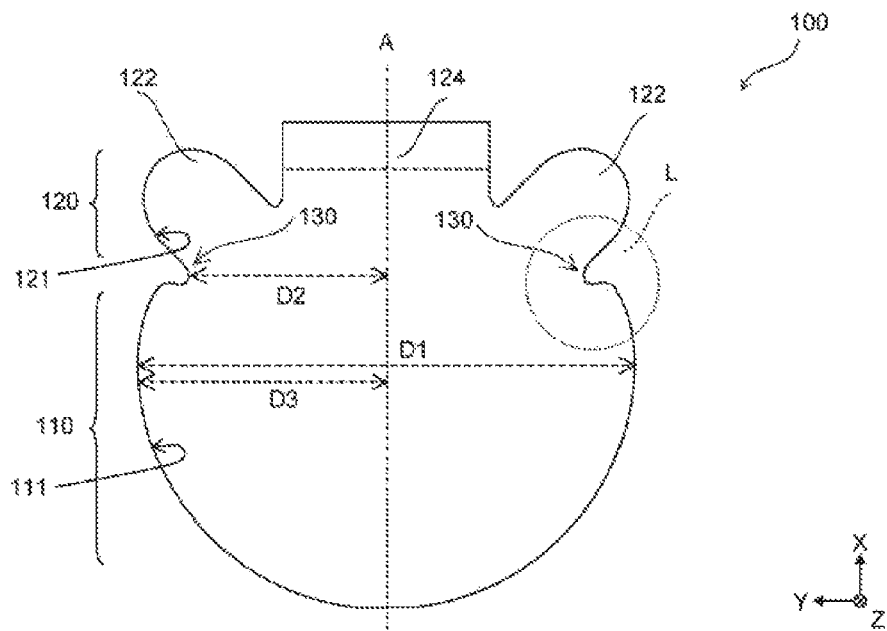
FIG. 5A is an enlarged schematic diagram of a chamber of a cartridge according to the first embodiment.

As shown in FIG. 5A, the chamber 100 is a region in which a sample is accommodated, and is provided with a first region 110 at a position away from the rotating shaft 42 and a second region 120 arranged at a position near the rotating shaft 42.

Figure 5B:
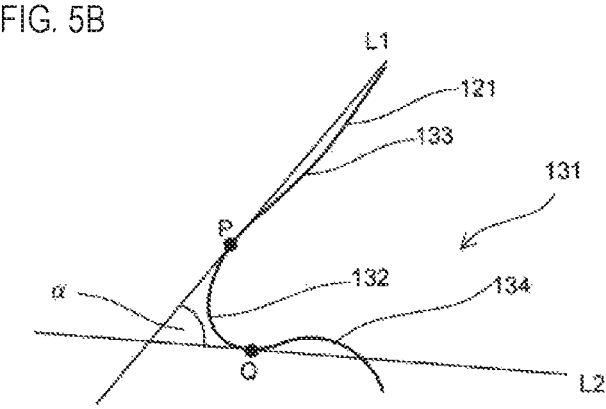
FIG. 5B is a schematic view further enlarging the protruding part of the chamber of FIG. 5A.

The chamber 100 also includes a protrusion 130 protruding toward the inner side of the chamber 100 in the circumferential direction. In FIG. 5A, two protrusions 130 arranged in the circumferential direction are provided, but only one protrusion also may be provided. The protrusion 130 surrounded by the larger circle of the broken line in FIG. 5A is configured as shown in FIG. 5B when it is enlarged. The protrusion 130 protrudes from a position between the first region 110 and the second region 120.

As described above, the first region 110 is "the region where the sample is stored", but this does not mean only the region occupied by the sample when the sample is accommodated in the chamber 100, and also includes the region where the sample can be accommodated.

The first area 110 will be described specifically. In FIG. 5A, a boundary L between the first region 110 and the second region 120 is indicated by a broken line. As shown in FIG. 5B, this boundary L is a line extending in the circumferential direction from the tip 132 of the tip portion 131 of the protrusion 130. In the chamber 100, the first region 110 and the second region 120 are separated by a boundary L. Note that the boundary L also includes an approximate straight line. A specific area of the second area 120 will be described later. Note that since the shape of the chamber 100 shown in FIG. 5A is bilaterally symmetrical in the Y-axis direction, the lines extending in the circumferential direction from the tips 132 of the protrusions 130 on both sides are the same.

The shapes of the first region 110 and the second region 120 following the protrusion 130 and the protrusion 130 will be described next. As shown in FIG. 5A and FIG. 5B, the protrusion 130 has a curved surface recessed inwardly of the chamber 100, and which is defined as a tip portion 131. At the tip portion 131, the tip 132 is positioned innermost of the chamber 100. In the second region 120, there is a part following the protrusion 130, that is, the connecting part 133 between the protrusion 130 and the second region 120. The connecting part 133 is a curved surface. The inner side surface 121 of the second region 120 is formed so as to be separated from the rotating shaft 42 toward the tip portion 131 of the protrusion 130. The protrusion 130 is an inner surface remote from the rotating shaft 42, wherein the inner surface 134 which continues from the tip portion 131 of the protrusion 130 to the first region 110 has a curved surface recessed inwardly of the protrusion 130.

Here, in FIG. 5B, the tip portion 131 is shown curved to the inner side the chamber 100. In this tip portion 131, the angle α formed by the tangent line L1 and the tangent line L2 at each of the point P and the point Q, which are the boundaries of a range in which the curvature is substantially constant, is set to an angle close to 90 degrees, for example, in the range of 80 degrees to 120 degrees. When an angle is formed in the stated range, the sample accommodated in the first region 110 can be suppressed from overriding the protrusion 130 due to the surface tension as shown by the dotted line arrow in FIG. 6B and prevented from moving to the second region 120. Hence, it is possible to reliably contain the sample in the first region 110.

Note that the angle α formed by the tangent line L1 and the tangent line L2 is not limited to the range of 80 degrees to 120 degrees and may be a more acute angle. The angle α formed by the tangential line L1 and the tangent line L2 can be appropriately adjusted depending on the shape of the protrusion 130, the characteristics of the sample accommodated in the chamber 100, and the like.

For example, in the above description, the tip portion 131 of the protrusion 130 is curved as shown in FIG. 5B, but the protrusion 130 itself also may be formed to have an acute angle.

Since the protrusion 130 has such a configuration, the chamber 100 has the following effects.

The depth of the protrusion 130 protruding inside the chamber 100 is not particularly limited as long as the liquid level of the sample accommodated in the chamber 100 is stabilized. For example, a distance of a first width, which is the largest width in the circumferential direction of the first region 110, is designated a distance D1, and a straight line bisecting the first width in the radial direction of the rotating shaft 42 is designated a straight line A, and a distance of a second width, which is a width in the circumferential direction between the straight line A and the tip 132 of the protrusion 130 is designated a distance D2, and the distance corresponding to half of the first width is designated a distance D3, as shown in FIG. 5A. At this time, when the distance D2 is in the range of 40% to 98% of the distance D3, the liquid level of the sample can be stabilized.

Figure 6A:
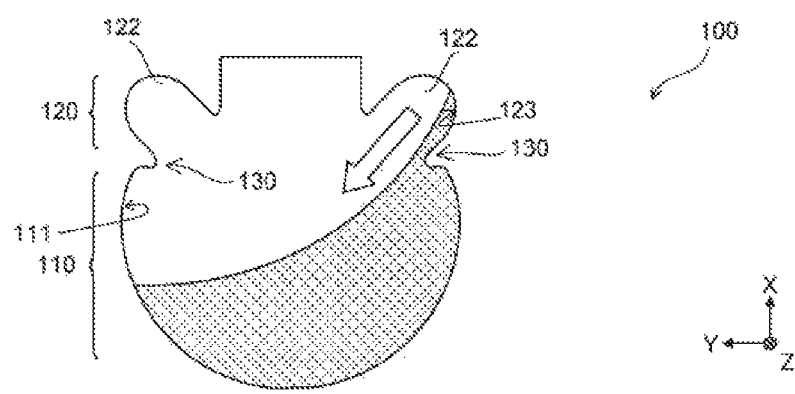
FIG. 6A to FIG. 6C are schematic diagrams showing the state of the liquid surface of the sample in the chamber during the rotational operation of the cartridge according to the first embodiment.

Even when the sample in the chamber 100 moves from the first region 110 to the second region 120 during the rotation operation of the chamber 100 as indicated by the outline arrow in FIG. 6A, the sample in the chamber 100 moves along the inner side surface 121 of the second region 120 due to centrifugal force and returns to the first region 110. Since the connecting part 133 is a curved surface, the sample scarcely remains on the connecting part 133 when the sample moves to the first region 110 along the inner surface 121 of the second region 120 due to the centrifugal force. Hence, the sample can be accommodated in the first region 110 without loss of sample.

Since the inner side surface 121 of the second region 120 is formed so as to be away from the rotating shaft 42 toward the tip portion 131 of the protrusion 130, the sample moving from the first region 110 to the second region 120 during the rotation operation moves from the base of the protrusion 130 to the top portion 131 by centrifugal force. Hence, the sample does not remain on the rotation shaft side of the protrusion. As described above, even when the sample moves to the second region 120, the sample does not override the protrusion 130 and stay in the second region 120. Therefore, the sample can be reliably accommodated in the first region 110 without loss of sample.

When the sample is moved toward the protrusion 130 along the inner side surface 111 of the first region 110 by the inertial force and the rotation operation is stopped, the sample flows toward the first region 110 since the direction of travel of the sample from the top portion 131 of the protrusion 130 along the inner side surface 134 to the first region 110 changes smoothly. Hence, the sample can be reliably contained in the first region 110.

Figure 6B:
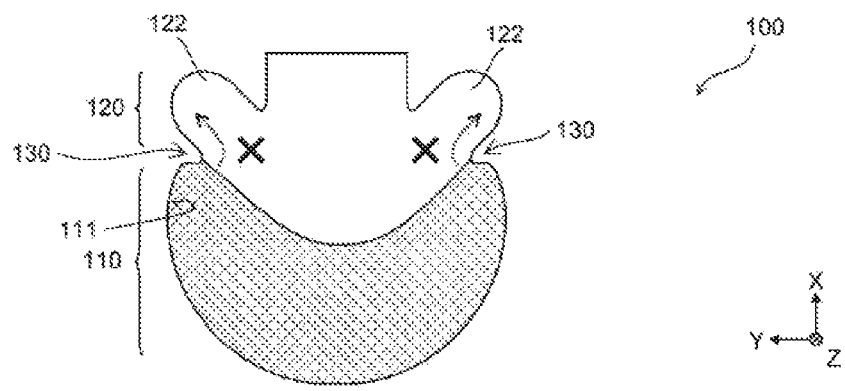

Since the angle α formed by the tangent line L1 and the tangent line L2 is 80 degrees to 120 degrees, the sample accommodated in the first region 110 is restricted from overriding the protrusion 130 and moving to the second region 120 due to surface tension as shown by the dotted arrow in FIG. 6B. Hence, it is possible to reliably contain the sample in the first region 110.

Figure 6C:
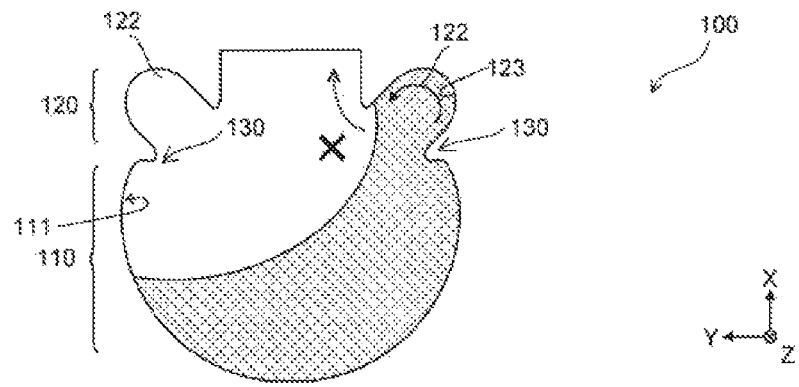

As shown in FIG. 1A, the flow path 22 is connected to the portion of the second region 120 closest to the rotating shaft 42. As shown in FIG. 5A, the second region 120 is provided with protrusion regions 122 which protrude toward the rotating shaft 42 on both sides in the circumferential direction across this portion. In this way as shown in FIG. 6C, even if the sample in the first region 110 moves to the second region 120 beyond the protrusion 130 during the rotation operation of the cartridge 20, it is received in the protrusion region 122. Therefore, as shown by a dotted line arrow in FIG. 6C, leakage of the sample from the second region 120 to the flow path 22 is suppressed, and the sample can reliably be retained in the chamber 100.

Here, the inner side surface 123 of the protrusion region 122 is a curved surface. In this way, as shown in FIG. 6C, the sample that has moved to the second region 120 beyond the protrusion 130 during the rotational movement, changes direction of travel toward the first region 110 while moving along the inner surface of the protrusion region 122. In this way the sample that has moved to the second region 120 is returned to the first region 110. Hence, the sample can be reliably contained in the first region 110.

As shown in FIG. 5A, in the chamber 100, an opening 124 is formed in the second region 120 to connect with the flow path 22. In the chamber 100, the region from the boundary L to the opening 124 is the region of the second region 120.

The volume of the first region 110 also is greater than 1 time and less than 2 times the amount of the sample to be contained in the first region 110. Therefore, the sample can be stably accommodated in the first region 110 by the wettability and surface tension of the projection 130.

The shape of the chamber 100 shown in FIG. 5A also is symmetrical in the circumferential direction. In this way the sample can be uniformly accommodated in the first region 110 in the circumferential direction. Whichever direction the cartridge 20 is rotated, the second region 120 can receive the sample in a well-balanced manner. Therefore, since the magnetic particles collect near the center of the chamber 100, that is, the first region 110, the magnetic particles are easily taken out by the magnet 50.

3. Specific Structure of Cartridge

A detailed structure of the cartridge 200 provided with a plurality of chambers 100 having the above-described shape will be described below. The chambers 100 provided in the cartridge 200 are identical chambers, but in this case, in order to distinguish chambers from FIG. 1A to FIG. 6C, different reference numerals are given to the respective chambers. Note that the chambers 211 to 216 in the cartridge 200 shown in FIG. 7A are all described as chambers having the same shape and capacity.

Figure 7A:
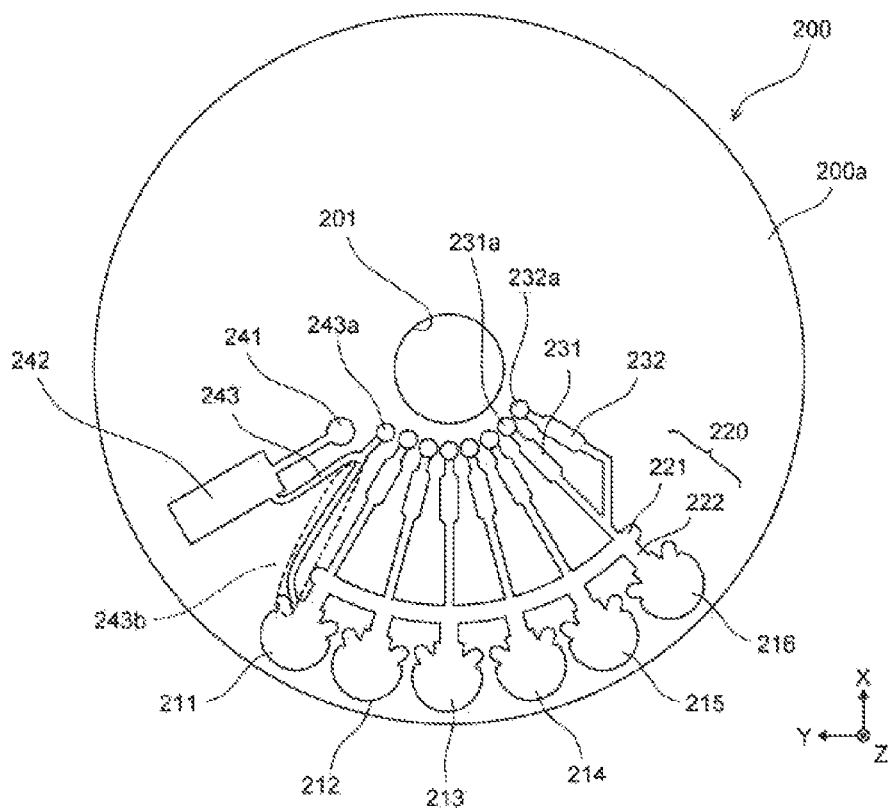
FIG. 7A is a view showing a configuration of a cartridge according to the first embodiment.

As shown in FIG. 7A, the cartridge 200 is composed of a plate-like and disk-shaped substrate 200a. Each part in the cartridge 200 is formed by gluing a concavity formed in the substrate 200a and a film (not shown) covering the entire surface of the substrate 200a. The substrate 200a and the film bonded to the substrate 200a are made of light-transmitting members.

On the substrate 200a, there are provided a hole 201, chambers 211 to 216, a channel 220, five reagent containers 231, a reagent container 232, an opening 241, a separating portion 242, and a channel 243. The hole 201 penetrates the substrate 200a at the center of the substrate 200a. The chambers 211 to 216 are arranged in the circumferential direction in the vicinity of the outer periphery of the substrate 200a. The cartridge 200 is installed in the detection device 10 so that the center of the hole 201 coincides with the rotating shaft 42.

The flow path 220 includes an arcuate first flow path 221 extending in the circumferential direction and six second flow paths 222 extending in the radial direction. The first flow path 221 is connected to the six second flow paths 222. The six second flow paths 222 are connected to the chambers 211 to 216, respectively. The five reagent containers 231 are connected to the flow path 220 via the flow paths and are on the extension lines of the second flow paths 222 connected to the chambers 211 to 216, respectively. The reagent containing portion 232 is connected to a flow path connecting the second flow path 222 connected to the chamber 216 and the reagent container 231 on the extension line of the second flow path 222 connected to the chamber 216 via the flow path.

In the reagent container 231, a sealing body 231a is provided on the inner side top surface in the radial direction. The sealing body 231a is opened by being pushed from above by a stopper opening portion (not shown). In this way the inside of the reagent container 231 is connected to the outside of the cartridge 200 at the position of the sealing body 231a.

Similarly, the reagent container 232 is also provided with a sealing body 232a on the inner side top surface in the radial direction. When the sealing body 232a is opened by a stopper opening portion (not shown), the inside of the reagent container 232 is connected to the outside of the cartridge 200 at the position of the seal 232a.

A blood sample of whole blood collected from the subject is injected into the separating portion 242 through the opening 241. The separating portion 242 separates the injected blood sample into blood cells and plasma. The plasma separated by the separating portion 242 moves to the channel 243. A hole 243a is provided on the radially inner top surface of the flow path 243. When the cartridge 200 is rotated, the plasma positioned in the region 243b in the channel 243 moves to the chamber 211 by centrifugal force. In this way a predetermined amount of plasma is transferred to the chamber 211.

Note that each structure of the substrate 200a is formed only in a region of one-third of the substrate 200a as shown in FIG. 7A. However, the present invention is not limited to this configuration inasmuch as a group of these configurations may be formed in the remaining two-thirds region, and three groups of structures may be provided on the substrate 200a.

Figure 7B:
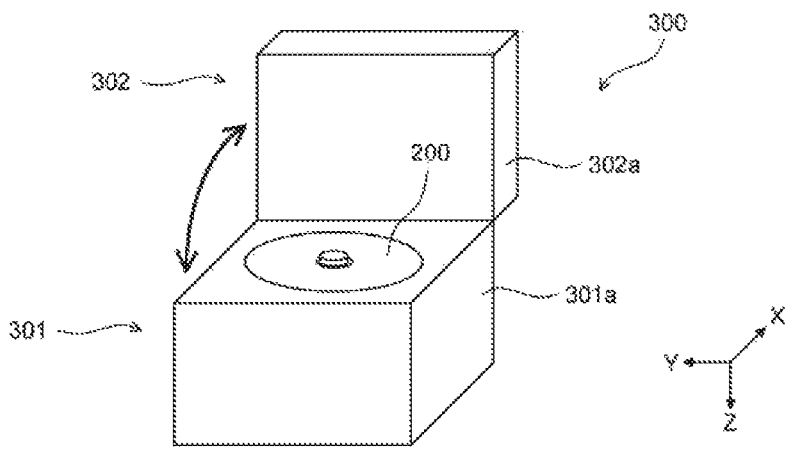
FIG. 7B is a schematic structural diagram showing an analyzer on which the cartridge according to the first embodiment is mounted.

The detection device 10 is mounted on, for example, the analyzer 300 shown in FIG. 7B. The analyzer 300 detects a target substance in a sample using an antigen-antibody reaction, and analyzes the target substance based on the detection result. The analyzer 300 includes a main body 301 and a lid 302. In the main body 301, the portion other than the portion facing the lid 302 is covered with the housing 301a. In the lid 302, the portion other than the portion facing the main body 301 is covered with the housing 302a. The main body 301 supports the lid 302 so as to be openable and closable. When attaching and detaching the cartridge 200, the lid 302 is opened as shown in FIG. 7B. A cartridge 200 is installed on the upper portion of the main body 301.

The operation of the detection device 10 will be described next with reference to FIG. 8.

First, the operator injects the blood sample collected from the subject through the opening 241, and installs the cartridge 200 on the support member 30. The target substance in the blood sample contains, for example, an antigen. As an example, the antigen is hepatitis B surface antigen (HBsAg). The target substance may be one or more of an antigen, an antibody, or a protein.

Prescribed reagents are stored in advance in the reagent containers 231 and 232 of the cartridge 200 and the chamber 211. Specifically, the R1 reagent is accommodated in the reagent container 231 located in the radial direction of the chamber 211. The R2 reagent is accommodated in the chamber 211. The R3 reagent is accommodated in the reagent container 231 located in the radial direction of the chamber 212. The cleaning liquid is contained in the reagent container 231 located in the radial direction of the chambers 213 to 215. The R4 reagent is contained in a reagent container 231 located in the radial direction of the chamber 216. The reagent container 232 accommodates the R5 reagent.

In the following control, the control unit 70 acquires the rotational position of the drive shaft of the motor 41 based on the output signal of the encoder (not shown) connected to the motor 41. The control unit 70 acquires the circumferential position of the cartridge 200 by detecting a predetermined portion of the rotating cartridge 200 with a sensor. Alternatively, the cartridge 200 may be installed at a predetermined position with respect to the support member 30. In this way the control unit 70 can position each part of the cartridge 200 at a predetermined position in the circumferential direction.

In step S11, when the control unit 70 starts the processing in step S12 and the following steps when the operator installs the cartridge 200.

In step S12, the control unit 70 transfers the plasma and the reagent to the chamber.

Specifically, the control unit 70 drives the motor 41 to rotate the cartridge 200. Then, the controller 70 drives the motor 41 to rotate the cartridge 200, transfer the plasma positioned in the region 243b to the chamber 211 by centrifugal force, and transfer the reagents accommodated in the six reagent containers 231 to the chambers 211-216. In this way in the chamber 211, plasma, R1 reagent, and R2 reagent are mixed. The R3 reagent is transferred to the chamber 212, the cleaning liquid is transferred to the chambers 213-215, and the R4 reagent is transferred to the chamber 216.

In step S12, when the transfer of the plasma and the reagent is completed, the control unit 70 also performs the stirring process. Specifically, the control unit 70 drives the motor 41 so as to switch between two different rotation speeds at predetermined time intervals while rotating in a predetermined direction. For example, the control unit 70 performs a stirring process by switching the current applied to the motor 41 at predetermined time intervals, or switching the driving of the motor 41 between on and off at predetermined time intervals. In this way the Euler force generated in the circumferential direction changes at predetermined time intervals, whereby the sample in the chambers 211 to 216 is stirred. Such a stirring process is performed not only in step S12 but also in steps S13 to S18 in the same manner after the transfer process.

Note that the control unit 70 also may perform the stirring process by switching the rotation direction of the motor 41 at predetermined time intervals. However, when the motor 41 is thus driven, the load of the motor 41 is increased. Therefore, as described above, it is preferable that the motor 41 is driven so as to switch between the two rotation speeds while rotating in a predetermined direction. The stirring process in step S12 will be described in detail later with reference to FIGS. 12 and 13.

Here, the R1 reagent contains a capture substance that binds to the target substance. The capture substance includes, for example, an antibody that binds to the target substance. The antibody is, for example, a biotin-conjugated HBs monoclonal antibody. The R2 reagent contains magnetic particles in the sample component. Magnetic particles are, for example, streptavidin-bound magnetic particles whose surface is coated with avidin. In step S12, when the plasma, the R1 reagent, and the R2 reagent are mixed and stirred, the target substance and the R1 reagent are bound by the antigen-antibody reaction. Then, due to the reaction between the antigen-antibody reactant and the magnetic particles, the target substance bound to the capture substance of the R1 reagent binds to the magnetic particle via the capture substance. In this way, a complex is generated in a state where the target substance and the magnetic particles are bonded.

Next, in step S13, the control unit 70 transfers the complex in the chamber 211 from the chamber 211 to the chamber 212. In this way the complex generated in the chamber 211 and the R3 reagent are mixed in the chamber 212. Here, the R3 reagent contains a labeling substance. The labeling substance includes a capture substance that specifically binds to the target substance and a label. For example, the labeling substance is a labeled antibody in which an antibody is used as a capture substance. In step S13, when the complex generated in the chamber 211 and the R3 reagent are mixed and agitated, the complex generated in the chamber 211 reacts with the labeled antibody contained in the R3 reagent. In this way a complex is formed in which the target substance, the capture substance, the magnetic particles, and the labeled antibody are bound.

Here, the process of step S13 will be described in detail with reference to FIG. 9. The flowchart in FIG. 9 is a flowchart showing in detail step S13 in FIG. 8. In the following description, refer to the state transition diagrams of FIGS. 10A to 11C as appropriate while referring primarily to FIG. 9.

Figure 10A:
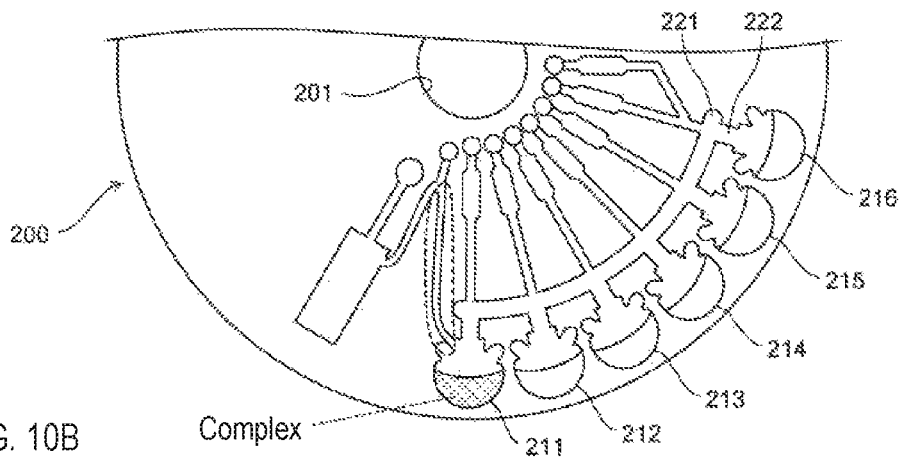
FIG. 10A to FIG. 10C are state transition diagrams schematically showing transfer of a complex between adjacent chambers according to the first embodiment.
Figure 10B:
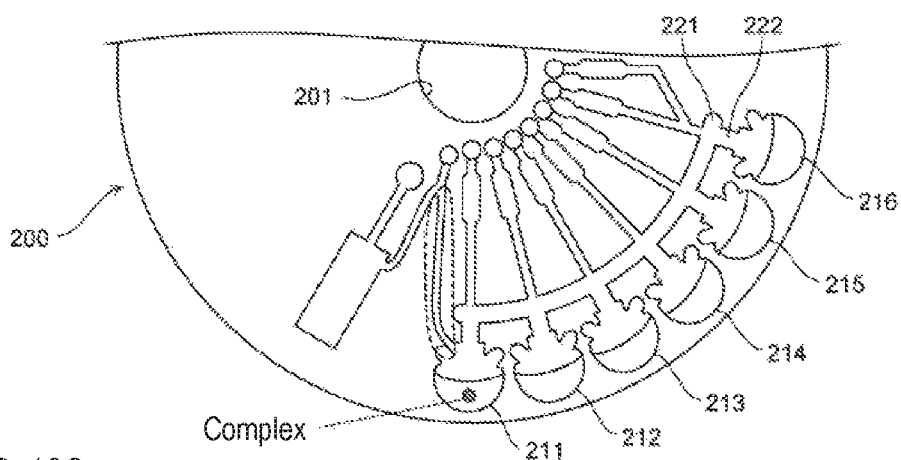
Figure 10C:
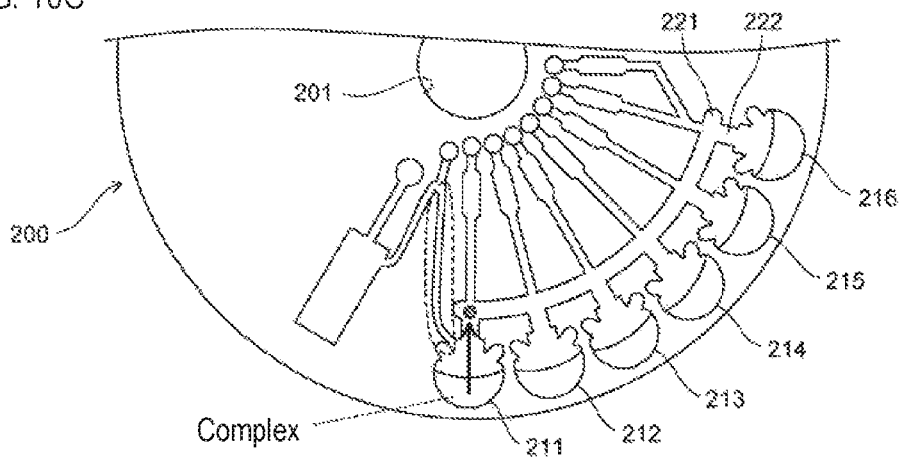

In step S12, as shown in FIG. 10A, the complex spreads in the chamber 211 before the stirring process is performed. Here, since the chamber 211 according to the first embodiment is a chamber having the shape described with reference to FIGS. 5A and 5B, the magnetic particles collect together when the sample is agitated in step S12. Hence, as shown in FIG. 10B, the complex in the chamber 211 can be efficiently collected by the magnet 50.

In step S102, the control unit 70 drives the transfer unit 60 to move the magnet 50 in a direction approaching the rotating shaft 42, and moves the complex to the connecting portion of the second flow path 222 connected to the chamber 211 and the first flow path 221.

Figure 11A:
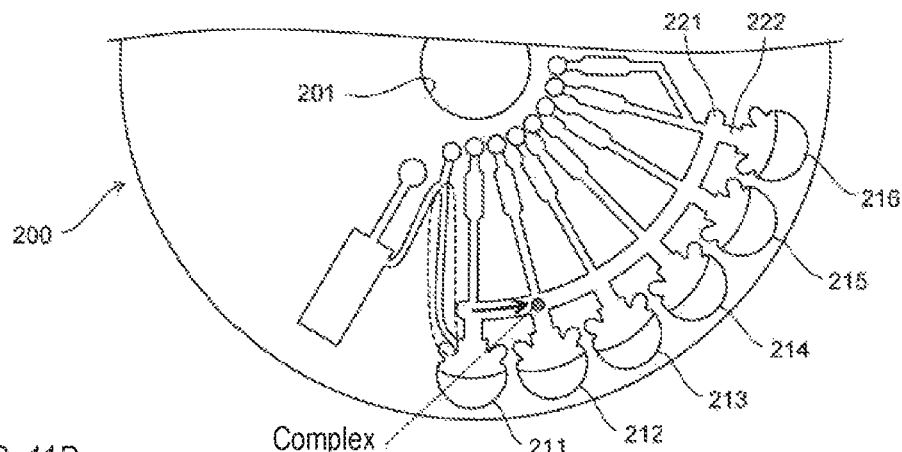
FIG. 11A to FIG. 11C are state transition diagrams schematically showing transport of a complex between adjacent chambers according to the first embodiment.

In step S103, the control unit 70 drives the motor 41 to rotate the cartridge 200, and as shown in FIG. 11A, the control unit 70 moves the complex to the connecting portion of the second flow path 222 connected to the chamber 212 and the first flow path 221. The speed at which the complex is moved with respect to the cartridge 200 in step S103 is set similarly to the case of step S102. The rotation of the cartridge 200 by the motor 41 is performed so as to realize the moving speed of the complex as described above.

Figure 11B:
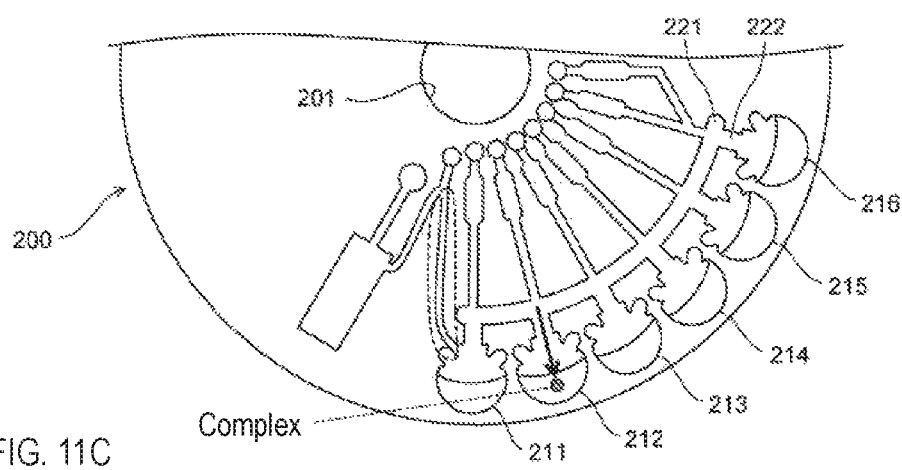
Figure 11C:
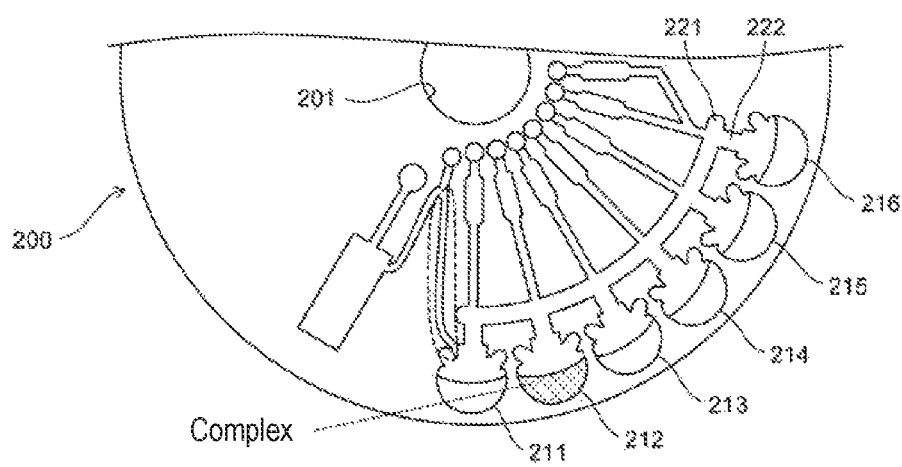

In step S104, the control unit 70 drives the transfer unit 60 to move the magnet 50 in a direction away from the rotating shaft 42, and transfers the complex to the chamber 212 as shown in FIG. 11B. The speed at which the complex is moved with respect to the cartridge 200 in step S104 is set similarly to step S102. In step S105, the control unit 70 drives the transfer unit 60 to move the magnet 50 away from the cartridge 200, and spreads the composite inside the chamber 212 as shown in FIG. 11C.

In steps S101 to S105 described above, after the magnet 50 is brought close to the cartridge 200 at the position facing the chamber 211, the control unit 70 moves the magnet 50 to the flow path 220 to position the magnet 50 opposite the chamber 212. Thereafter, the control unit 70 separates the magnet 50 from the cartridge 200, and releases the magnetism of the complex induced by the magnet 50.

In step S106, the control unit 70 performs the stirring process described above. At this time, before the stirring process, the magnetism of the composite is released and the complex spreads in the chamber 212, so that the sample in the chamber 212 is reliably stirred.

Figure 8:
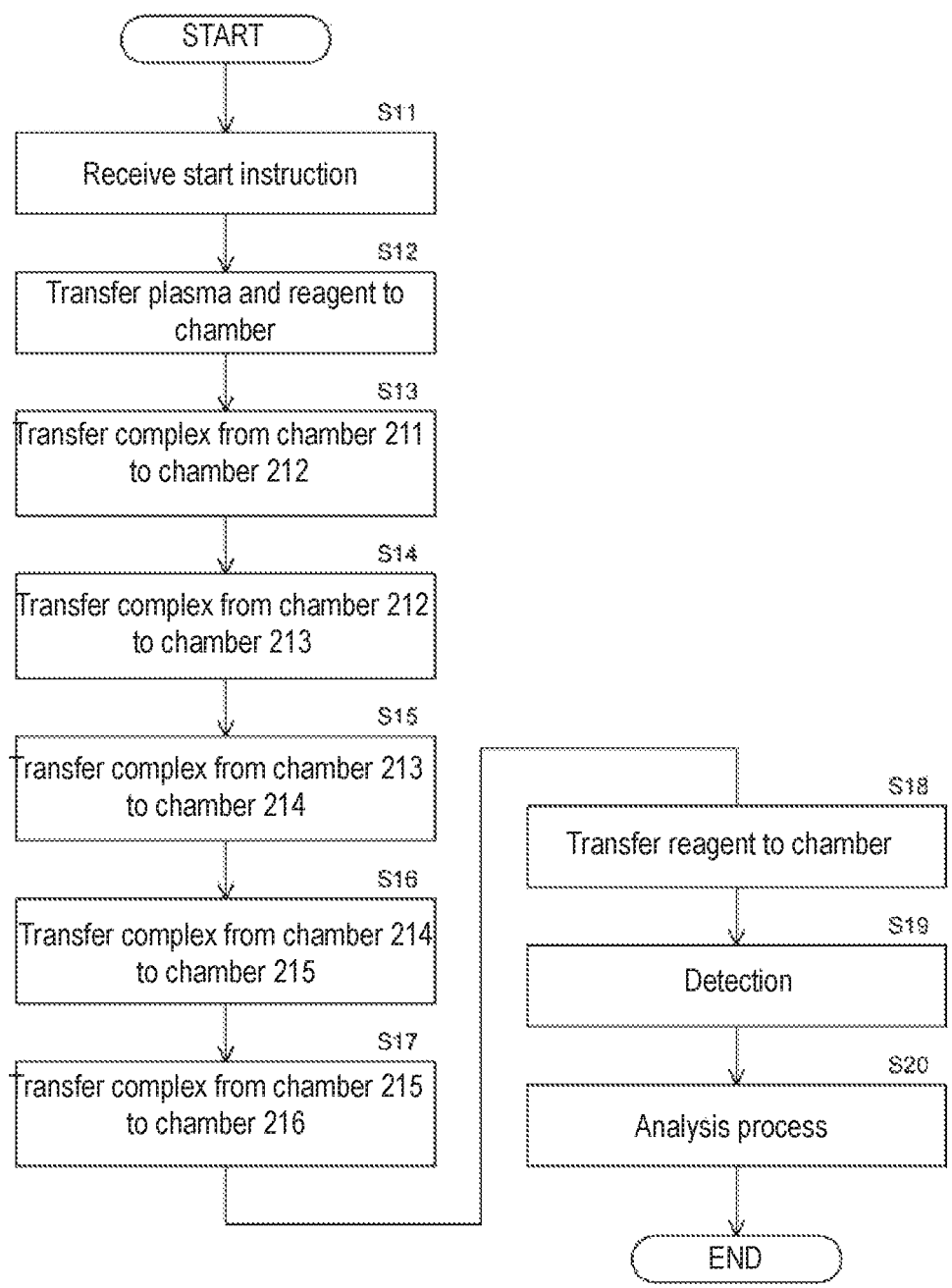
FIG. 8 is a flowchart showing the operation of the analyzer according to the first embodiment.

The process of step S13 in FIG. 8 is performed As described above. Note that the transfer process and the stirring process shown in steps S101 to S106 are similarly performed in steps S14 to S17 described later.

Returning to FIG. 8, in step S14 the control unit 70 transfers the complex in the chamber 212 from the chamber 212 to the chamber 213. In this way in the chamber 213 the complex generated in the chamber 212 and the cleaning liquid are mixed. In step S14, when the complex generated in the chamber 212 and the cleaning liquid are mixed and stirred, the complex and the unreacted substance are separated in the chamber 213. That is, unreacted substances are removed by cleaning in the chamber 213.

In step S15, the control unit 70 transfers the complex in the chamber 213 from the chamber 213 to the chamber 214. In this way the complex generated in the chamber 212 and the cleaning liquid are mixed in the chamber 214. Even in the chamber 214, unreacted substances are removed by cleaning.

In step S16, the control unit 70 transfers the complex in the chamber 214 from the chamber 214 to the chamber 215. In this way the complex generated in the chamber 212 and the cleaning liquid are mixed in the chamber 215. Unreacted substances are removed by cleaning even in chamber 215.

In step S17, the control unit 70 transfers the composite in the chamber 215 from the chamber 215 to the chamber 216. In this way the complex generated in the chamber 212 and the R4 reagent are mixed in the chamber 216. Here, the R4 reagent is a reagent for dispersing the complex generated in the chamber 212. The R4 reagent is, for example, a buffer solution.

In step S17, when the complex generated in the chamber 212 and the R4 reagent are mixed and stirred, the complex generated in the chamber 212 is dispersed.

In step S18, the control unit 70 transfers the R5 reagent to the chamber 216.

Specifically, the control unit 70 drives the motor 41 to rotate the cartridge 200. Then, the control unit 70 drives the motor 41 to rotate the cartridge 200, and transfers the R5 reagent stored in the reagent container 232 to the chamber 216 by centrifugal force. In this way the R5 reagent is further mixed with the mixed solution generated in step S17 in the chamber 216.

Here, the R5 reagent is a luminescent reagent comprising a luminescent substrate that produces light upon reaction with a labeled antibody bound to the complex. In step S18, when the mixed solution produced in step S17 and the R5 reagent are mixed and stirred, a sample is prepared. This sample chemilumineses by reacting the labeling substance bound to the complex with the luminescent substrate.

In step S19, the control unit 70 drives the motor 41 to position the chamber 216 right above the detection unit 80, and detects the light generated from the chamber 216 by the photodetector 82. In step S20, the control unit 70 performs analysis processing related to immunity based on the light detected by the photodetector 82. When the photodetector 82 is configured by a photomultiplier tube, a pulse waveform corresponding to the photon reception is output from the photodetector 82. The detection unit 80 counts photons at regular intervals based on the output signal of the photodetector 82 and outputs a count value. Based on the count value output from the detection unit 80, the control unit 70 analyzes the presence or absence and the amount of the target substance.

As described above, the complex is sequentially transferred in the chambers 211 to 216. When the complex is transported through a plurality of chambers in this manner, the complex is likely to be left behind in the chambers 211 to 215 and the flow path 220.

However, when the complex is reliably transported by using the magnet 50 as described above, it is possible to reliably prevent the complex from being left behind. In this way an unintentional decrease in the amount of light detected by the photodetector 82 can be suppressed. Therefore, it is possible to suppress false negatives due to an unintended decrease in light quantity, so that highly accurate detection can be performed.

Note that chemiluminescence is light emitted using energy by chemical reaction, for example, light emitted when a molecule is excited by a chemical reaction to an excited state and returns to the ground state from the excited state. Chemiluminescence can be generated, for example, by reaction between an enzyme and a substrate by applying an electrochemical stimulus to a labeling substance, or based on the LOCI method (Luminescent Oxygen Channeling Immunoassay). In the first embodiment, any chemiluminescence may be performed.

When a light of a predetermined wavelength is irradiated, a substance excited with fluorescence and a target substance may be combined to constitute a complex. In this case, a light source is arranged to irradiate light on the chamber 216. The photodetector 82 detects the fluorescence excited from the substance bound to the complex by the light from the light source.

Note that the magnetic particles may be particles used for ordinary immunoassay that contain a magnetic material as a base material. For example, magnetic particles using $Fe_2O_3$ and/or $Fe_3O_4$, cobalt, nickel, ferrite, magnetite or the like can be used as the base material. The magnetic particles may be coated with a binding substance for binding to the target substance, or may be bound to the target substance via a capture substance for binding the magnetic particles and the target substance. The capture substances are magnetic particles and antigens or antibodies which mutually bind to the target substance.

The labeling substance also includes, for example, a capture substance that specifically binds to the target substance and a label for chemiluminescence. The capture substance is not particularly limited insofar as it specifically binds to the target substance. In the first embodiment, the capture substance binds to the target substance by an antigen-antibody reaction. More specifically, although the capture substance is an antibody in the first embodiment, when the target substance is an antibody, the capture substance may be an antigen of the antibody. When the target substance is a nucleic acid, the capture substance may be a nucleic acid complementary to the target substance. As the label contained in the labeling substance, for example, an enzyme, a fluorescent substance, a radioactive isotope and the like can be mentioned. Examples of the enzyme include alkaline phosphatase (ALP), peroxidase, glucose oxidase, tyrosinase, acid phosphatase and the like. When performing electro-chemiluminescence as chemiluminescence, the label is not particularly limited insofar as it is a substance that emits light by electrochemical stimulation, for example, a ruthenium complex. As fluorescent substances, fluorescein isothiocyanate (FITC), green fluorescent protein (GFP), luciferin and the like can be used. As the radioactive isotope, 125I, 14C, 32P and the like can be used.

When the label is an enzyme, a known luminescent substrate may be appropriately selected according to the enzyme to be used as the luminescent substrate for the enzyme. The following examples can be used as a chemiluminescent substrate: when alkaline phosphatase is used as an enzyme, CDP-Star (registered trademark), (4-chloro-3-(methoxyspiro[1,2-dioxetane-3,2'-(5'-chloro) Trioxysilo [3.3.1.1 3,7]decane]-4-yl) phenyl phosphate), CSPD (registered trademark) (3-(4-methoxyspiro[1,2-dioxetane-3,2-(5'-chloro) tricyclo[3.3.1.13,7]decane]-4-yl) phenyl phosphate); luminescent substrates such as p-nitrophenyl phosphate, 5-bromo-4-chloro-3-indolyl phosphate (BCIP), 4-nitro blue tetrazolium chloride (NBT), iodonitrotetrazolium (INT); fluorescent substrates such as 4-methyl umbellifeni-phosphate (4MUPO); and chromogenic substrates such as 5-bromo-4-chloro-3-indolyl phosphate (BCIP), 5-bromo-6-chloro-indolyl phosphate disodium, p-nitrophenyl phosphorus and the like can be used.

Rotation Operation of Cartridge

Here, the stirring process in step S106 will be described in detail. In the present embodiment, the stability of the liquid surface of the sample in the chamber 100 immediately after stirring is important. When the cartridge 200 suddenly stops rotating, the liquid surface of the sample undulates severely in the chamber 100, and it may take time until the liquid surface becomes stable. Due to severe undulation, there also is a possibility that a part of the sample may override the protrusion 130 of the chamber 100 and further leak from the second region 120 to the second flow path 222 of the flow path 220. In this case, if magnetic particles are contained in the sample leaked from the inside of the chamber 100 into the second flow path 222, the accuracy of detection of the target substance is reduced since the number of magnetic particles contained in the chamber 100 decreases. Therefore, the rotation operation of the cartridge 200 according to the first embodiment is controlled as follows.

First, the stirring of the sample, that is, the control of the rotation operation of the cartridge 200 will be described. As the cartridge 200 rotates, the chamber 100 rotates. At this time, the control unit 70 decreases the rotation speed after increasing the rotation speed of the cartridge 200. Meanwhile, a magnetic force is applied to the magnetic particles, and the magnetic particles move in the radial direction of the rotating shaft 42 to collect the target substance.

Figure 12:
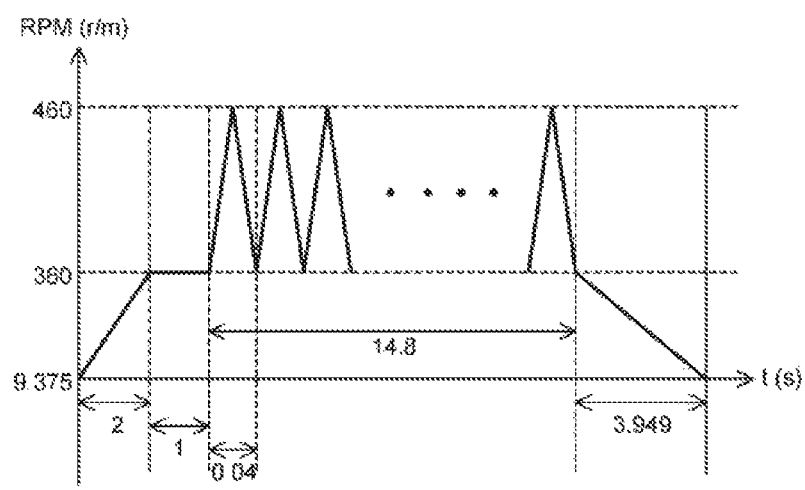
FIG. 12 is a graph for illustrating the rotation operation of the cartridge according to the first embodiment.

Specifically, as shown in the graph of FIG. 12, when the stirring is started, the control unit 70 sets the rotation of the cartridge 200 to 9.375 (r/m), and the rotation unit 40 is controlled such that the rotation of the cartridge 200 increases from 9.375 (r/m) to 360 (r/m) over 2 seconds from the start of stirring. The control unit 70 controls the rotating unit 40 so as to maintain the rotation of the cartridge 200 at 360 (r/m) for 1 second two seconds from the start of stirring. Thereafter, the rotation number of the cartridge 200 is increased from 360 (r/m) to 460 (r/m) and lowered again to 360 (r/m). The rotation unit 40 is caused to execute this in 0.04 seconds as one cycle. The control unit 70 causes the cartridge 200 to execute the above rotation for 370 cycles, that is, for 14.8 seconds. Thereafter, the control unit 70 controls the rotation unit 40 to rotate the cartridge 200 from 360 (r/m) to 9.375 (r/m) over 3.949 seconds.

Figure 13:
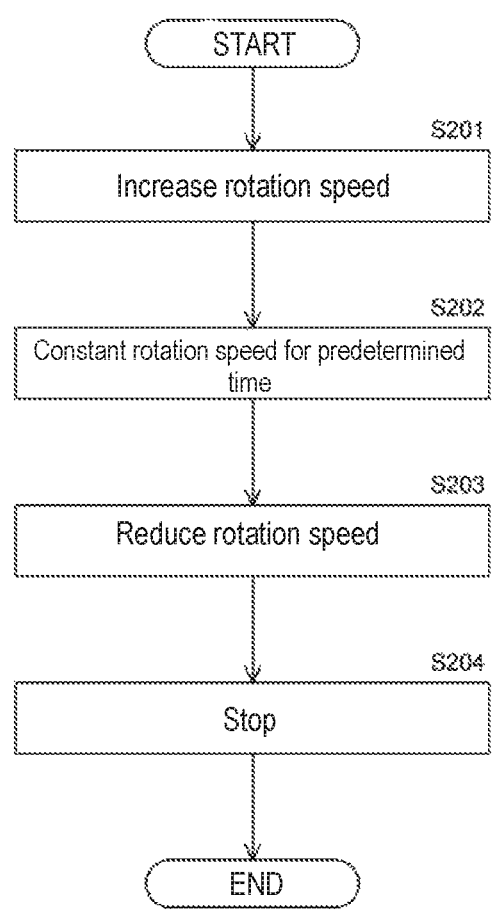
FIG. 13 is a flowchart showing control when stopping the stirring of a sample by rotation of a cartridge according to the first embodiment.

Next, the control when the cartridge 200 is stopped will be described with reference to FIGS. 13 to 14D. In the flowchart shown in FIG. 13, the point of time at which the stirring described in FIG. 9 is completed is set as the start.

Figure 14A:
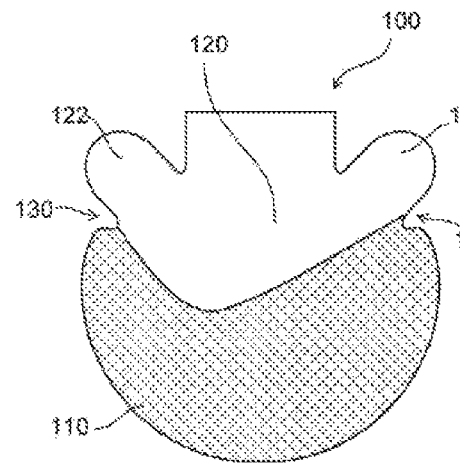
FIG. 14A to FIG. 14D are schematic diagrams showing the state of the liquid surface of the sample under agitation by rotation of the cartridge in the first embodiment.

As shown in FIG. 14A, the liquid surface of the sample immediately after stirring is fluctuates unstably. In step S201, the control unit 70 once increases the rotation speed of the cartridge 200 over a predetermined time. That is, in the graph of FIG. 12, when the rotation number of the cartridge 200 reaches 9.375 (r/m), the control unit 70 increases the rotation speed of the cartridge 200 to a predetermined value and rotates the cartridge 200 to the rotation unit 40. This predetermined value differs for each target substance.

In step S202, the control unit 70 maintains the rotation speed of the cartridge 200 raised to a predetermined value in step S201 to be constant for a predetermined time.

Figure 14B:
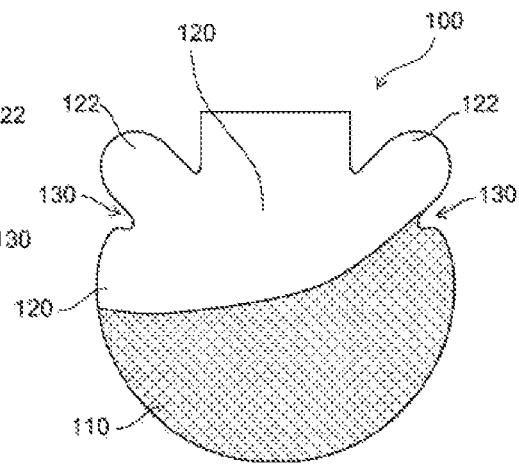
Figure 14C:
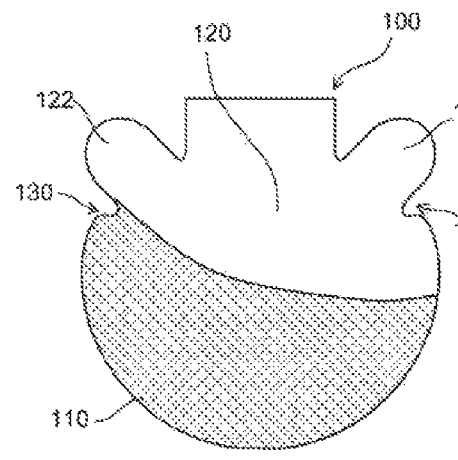
Figure 14D:
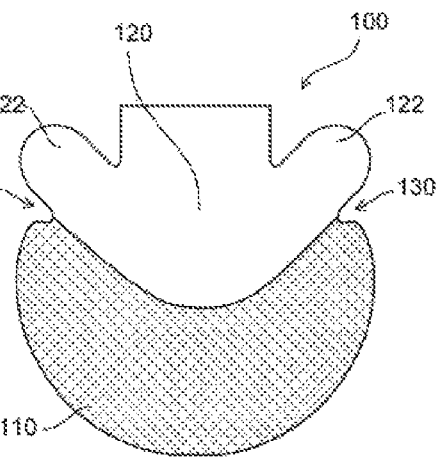

In step S203, the control unit 70 decreases the rotation speed of the cartridge 200 over a predetermined time. The control unit 70 controls the rotation unit 40 to slacken the rotation of the cartridge 200. In steps S202 and S203, the sample oscillates in the chamber 100 to the left and right of the Y-axis as shown in FIGS. 14B and 14C.

In step S204, the control unit 70 stops the rotation of the cartridge 200 in the rotation unit 40. At this time, as shown in FIG. 14D, the sample in the chamber 100 is accommodated in the first region 110 with the projection 130 as a boundary, and the liquid level is stabilized.

By repeatedly stirring and stopping as described above, the liquid surface of the sample in the chamber 100 is stabilized, and the magnetic particles gather near the center of the first region 110. Therefore, the magnetic particles in the chamber 100 are smoothly transferred by the magnet 50 without being left behind.

Modification Example of Shape of Chamber

A modified example of the shape of the chamber 100 provided in the cartridge 20 according to the present embodiment will be described below with reference to FIG. 15A to FIG. 15F.

(1) When the Protrusions are Provided in Multiple Stages

Figure 15A:
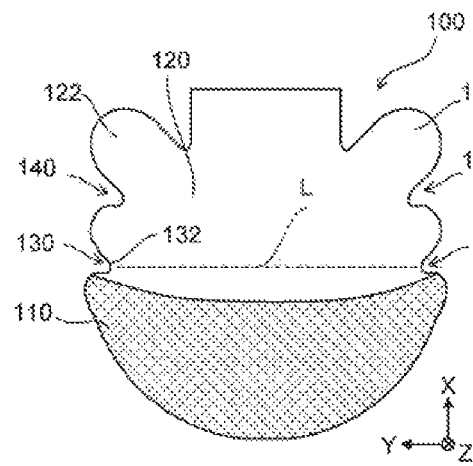
FIG. 15A to FIG. 15F are modification examples of the shape of the chamber according to the first embodiment.
Figure 15B:
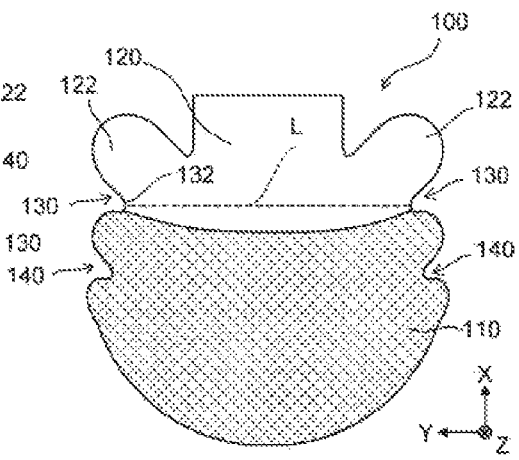

As shown in FIGS. 15A and 15B, a set of protrusions 130 aligned in the circumferential direction is disposed in the radial direction, and another set of projections also may be formed. In FIG. 15A, the protrusion that is distant from the rotating shaft 42 is the protrusion 130, and the other protrusion that is formed closer to the rotating shaft 42 is the protrusion 140. When the protrusion 130 and the protrusion 140 are thus formed as shown in FIG. 15A and the sample is small, a line extending in the circumferential direction passing through the tip 132 of the protrusion 130 is defined as a boundary L which distinguishes between the first area 110 and the second area 120. In this way the liquid level of the sample can be reliably stabilized. On the other hand, when the amount of the sample is large, as shown in FIG. 15B, the protrusion closer to the rotating shaft 42 is defined as the protrusion 130, and the other protrusion that is formed farther from the rotating shaft 42 is the protrusion 140. In this case, the first region 110 and the second region 120 are distinguished by a line extending in the circumferential direction through the tip 132 of the protrusion 130 closer to the rotating shaft 42 that is designated as a boundary L. In this way the liquid level of the sample can be reliably stabilized.

Also in the case where the amount of the sample accommodated in the chamber 100 changes, the sample can be stably accommodated in the first region 110 by selecting the most suitable protrusion 130 when using the chamber 100 as shown in FIGS. 15A and 15B. For example, in the case where the cartridge 200 shown in FIG. 7A is widely used, the amount of the sample and the reagent introduced into each chamber 100 may vary according to the measurement item. In such a case, two kinds of samples can be dealt with by using the chamber 100 shown in FIGS. 15A and 15B. Hence, the cartridge 200 can be used in a versatile manner. Note that a set of protrusions configured by a set of protrusions 130 arranged in the circumferential direction may be three or more. In this way the type of liquid volume that can be handled is further increased.

Figure 15C:
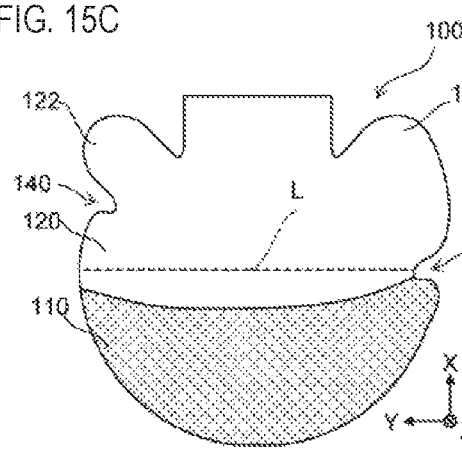
Figure 15D:
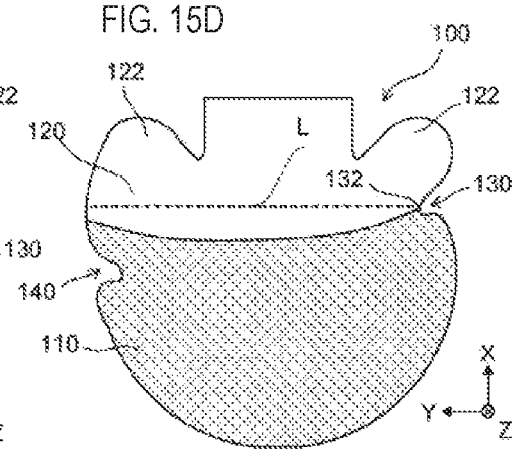

(2) When Another Protrusion is Provided at Different Positions in the Radial Direction As shown in FIGS. 15C and 15D, the protrusion 130 may be provided, and the other protrusions 140 may be provided at different positions in the radial direction. In the example of FIG. 15C, a protrusion 130 is formed at a position close to the rotating shaft 42 on the Y-axis positive side, and a protrusion 140 is formed at a position different from that of the protrusion 130 in the radial direction, that is, on the Y-axis negative side. In this way when the amount of the sample is small, the liquid level can be stabilized by the protrusion 130.

On the other hand, in FIG. 15D, a protrusion formed at a position distant from the rotating shaft 42 on the positive side of the Y-axis is defined as the protrusion 130, and a protrusion 140 is formed on the Y-axis negative side at a position different from the protrusion 130 in the radial direction. In this way when the sample is large, the liquid surface can be stabilized by the protrusion 130 with the boundary between the first region 110 and the second region 120 as a boundary L. That is, the space of the first region 110 can be expanded according to the amount of the sample.

Note that in this configuration example, since one protrusion 130 is allocated to the amount of one sample, as compared with the configuration of FIGS. 15A and 15B, the effect of stabilizing the liquid level is slightly reduced. However, also in this case, the liquid level can be stabilized by the surface tension and the wettability between the protrusion 130 and the sample. Also in this case, the protrusion 130 may be formed in the radial direction, and the other protrusion 140 may be formed at three or more positions different from the protrusion 130. At this time, as described above, the boundary L between the first region 110 and the second region 120 approaches or moves away from the rotating shaft 42, and the volumes of the first region 110 and the second region 120 change. In this way the type of liquid volume that can be handled is further increased.

(3) When There is Only One Protrusion

Figure 15E:
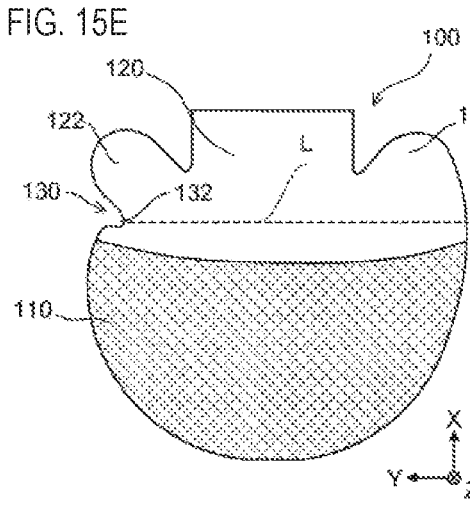

As shown in FIG. 15E, only one protrusion also may be provided in the chamber 100. In this case as well, as in the case of FIGS. 15C and 15D, the liquid level can be stabilized by the surface tension and the wettability between the protrusion 130 and the sample. Although the protrusion 130 is formed on the Y-axis positive side in FIG. 15E, the protrusion 130 also may be formed on the Y-axis negative side.

(4) When the Depth of the Protrusion is Different

Figure 15F:
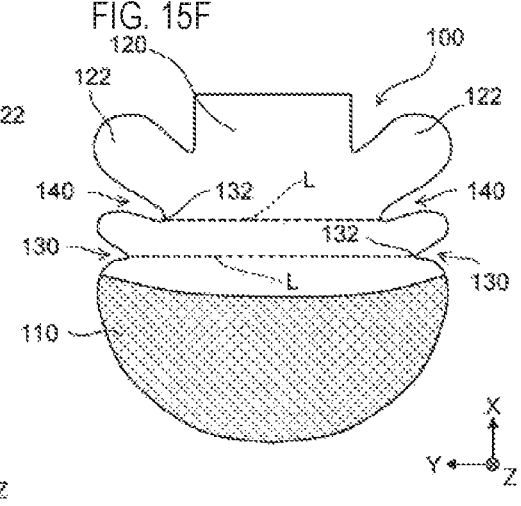

As shown in FIG. 15F, the protrusion 130 and the other protrusion 140 also may have different protrusion heights in the inward direction of the chamber 100 in the configurations of FIGS. 15A and 15B. In the configuration of FIG. 15A and FIG. 15B, when a large amount of sample is introduced into the chamber 100, the sample overrides the projection 130 to the inner side surface 123 of the protrusion region 122, and there is a possibility of leakage of the sample into the flow path 220. On the other hand, as shown in FIG. 15F, the protrusion formed closer to the rotating shaft 42 which is formed so as to protrude deeper into the chamber 100 is the protrusion 130. In this way it is difficult for the sample to move to the protrusion region 122, and it is possible to more reliably prevent the sample from moving from the protrusion region 122 to the flow channel 220.

Note that even the chamber 100 shown in FIG. 15F can use a protrusion located farther from the rotating shaft 42 as the protrusion 130. In this case, the protrusion at the position close to the rotary shaft 42 becomes another protrusion 140.

Second Embodiment

Figure 16:
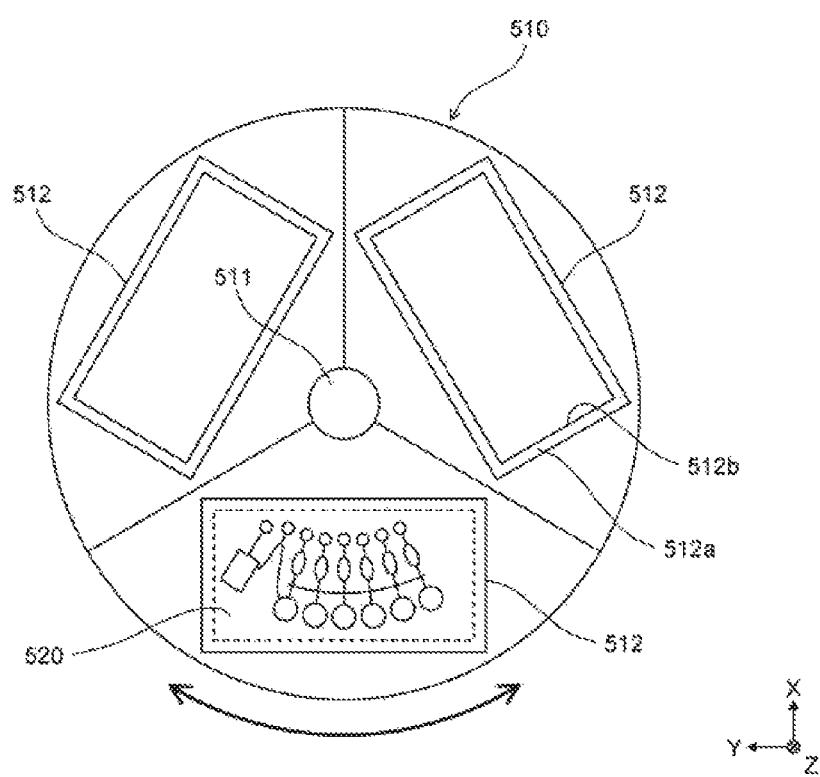
FIG. 16 is a diagram showing a configuration of a cartridge according to the summary of a second embodiment.
Figure 17:
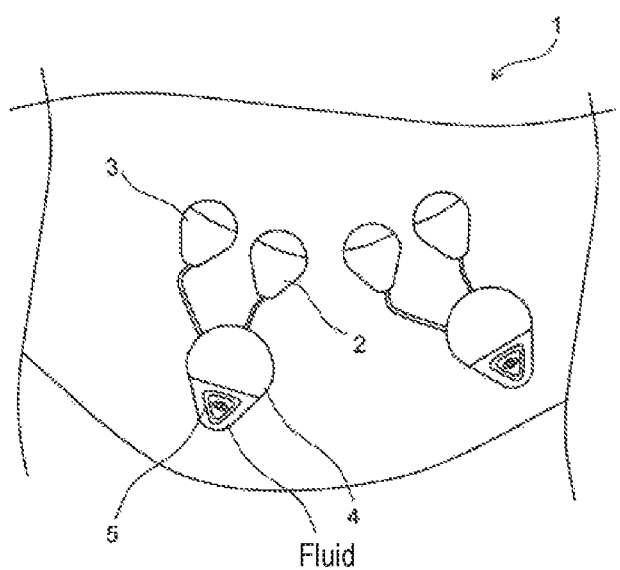
FIG. 17 is a schematic diagram illustrating a configuration according to the related art.

In the second embodiment shown in FIG. 16, a support member 510 is disposed instead of the support member 30, and a cartridge 520 is used instead of the cartridge 200.

The other structures are the same as the specific configuration of the first embodiment.

The support member 510 includes a hole 511 and three installation parts 512. The hole 511 is provided at the center of the support member 510. The support member 510 is installed on the rotating shaft 42 via a predetermined member. In this way the support member 510 can rotate around the rotating shaft 42. Three installation parts 512 are provided in the circumferential direction. The installation part 512 includes a surface 512a and a hole 512b. The surface 512a is one stage lower than the upper surface of the support member 510. The hole 512b is formed at the center of the surface 512a and passes through the support member 510 in the vertical direction. The cartridge 520 has a rectangular shape and has the same configuration as the cartridge 200.

As in the case of the cartridge 200, the operator injects the blood sample into the cartridge 520 and installs the cartridge 520 in the setting unit 512. Then, similarly to the first embodiment, the control unit 70 drives the motor 41, the transfer unit 60, and the detection unit 80. In this way similar to the first embodiment, the complex in the cartridge 520 is reliably transported by the magnet 50. Therefore, as in the first embodiment, it is possible to maintain high analytical accuracy of the target substance by the detection device 10. In the second embodiment, since the cartridge 520 also can be installed in each of the three installation parts 512, analysis can be performed on three cartridges 520 at the same time.

What is claimed is:

1. A cartridge for detecting a target substance, comprising:
a chamber configured to accommodate a sample containing the target substance, the chamber comprising:
a first region comprising a closed space at an outward side of the cartridge;
a second region disposed at a position closer to a center of the cartridge than the first region; and
at least two protrusions protruding inward inside the chamber from a position between the first region and the second region toward a centerline of the chamber, and located at positions facing each other in a circumferential direction of the cartridge, wherein the centerline of the chamber runs in a radial direction outward from the center of the cartridge though a center of the chamber, wherein the radial direction is orthogonal to the circumferential direction,
wherein a first side surface of each of the at least two protrusions on a side further from the center of the cartridge and a second side surface of each of the at least two protrusions on a side closer to the center of the cartridge are angled toward each other to form tips of the at least two protrusions,
wherein the second region is connected to a flow path and includes protruding regions protruding outward on both sides in the circumferential direction of the flow path and away from the centerline of the chamber, and
wherein a boundary between the first region and the second region is defined as a line extending between the tips of the at least two protrusions.

2. The cartridge according to claim 1, wherein the second side surface of at least one protrusion on a side closer to the center of the cartridge is angled away from the center of the cartridge toward the tip of the at least one protrusion.

3. The cartridge according to claim 1, wherein the second side surface of the at least two protrusions includes an arcuate curved surface recessed closer to the center of the cartridge relative to the tip of the at least two protrusion.

4. The cartridge according to claim 1, wherein a set of two other projections is provided in the radial direction from the center of the cartridge.

5. The cartridge according to claim 1, wherein the protrusion and the other protrusion are respectively provided at different positions in the radial direction from the center of the cartridge.

6. The cartridge according to claim 1, further comprising the sample contained in the first region, wherein the volume of the first region is greater than one times an amount, but less than two times the amount, of sample contained in the first region.

7. The cartridge according to claim 1, wherein the protruding regions protrude toward a side of the flow path facing the center of the cartridge.

8. The cartridge according to claim 7, wherein an inner surface of at least one of the protruding regions is a curved surface.

9. The cartridge according to claim 1, wherein an inner surface of a part of the first region further from the center of the cartridge includes an arcuate curved surface recessed in a direction away from the center of the cartridge.

10. The cartridge according to claim 1, wherein the chamber has a symmetrical shape in the circumferential direction.

11. The cartridge according to claim 1, wherein at least one of the tips of the at least two protrusions is formed as a curved surface.

12. The cartridge according to claim 1, further comprising a plurality of said chambers.

13. The cartridge according to claim 12, wherein the volume of the first region in at least one of the chambers is different from the volume of the first region in another chamber.

14. The cartridge according to claim 12, further comprising a flow path for connecting adjacent chambers of the plurality of chambers.

15. The cartridge according to claim 12, comprising:
a plurality of reagent containers containing reagents connected to the plurality of chambers.

16. The cartridge according to claim 15, wherein predetermined reagent containers among the plurality of reagent containers include a capture substance configured to bind to the target substance.

17. The cartridge according to claim 15, wherein the predetermined reagent container of the plurality of reagent contains in which the reagent is contained contains magnetic particles.

18. The cartridge according to claim 1, wherein the first side surface of at least one of the at least two protrusions on the side further from the center of the cartridge is angled away from the center of the cartridge toward the tip of the at least one of the at least two protrusions.

19. A detection device comprising:
a cartridge according to claim 1;
a rotating unit that rotates the cartridge around a rotating shaft;
a detection unit for detecting a target substance; and
a control unit that controls the rotating unit.

* * * * *